(12) United States Patent
Kan et al.

(10) Patent No.: US 11,561,412 B2
(45) Date of Patent: Jan. 24, 2023

(54) EYEWEAR

(71) Applicant: Mitsui Chemicals, Inc., Tokyo (JP)

(72) Inventors: Ryuki Kan, Nagoya (JP); Hirofumi Asada, Niihama (JP); Tsuyoshi Kamibeppu, Nagoya (JP); Takafumi Ohto, Nagoya (JP); Masayoshi Hino, Saijo (JP)

(73) Assignee: MITSUI CHEMICALS, INC., Tokyo (JP)

(*) Notice: Subject to any disclaimer, the term of this patent is extended or adjusted under 35 U.S.C. 154(b) by 131 days.

(21) Appl. No.: 16/968,148

(22) PCT Filed: Feb. 6, 2019

(86) PCT No.: PCT/JP2019/004292
§ 371 (c)(1),
(2) Date: Aug. 6, 2020

(87) PCT Pub. No.: WO2019/156129
PCT Pub. Date: Aug. 15, 2019

(65) Prior Publication Data
US 2020/0363567 A1 Nov. 19, 2020

(30) Foreign Application Priority Data

Feb. 7, 2018 (JP) .............................. JP2018-020430
Sep. 28, 2018 (JP) .............................. JP2018-185330

(51) Int. Cl.
*G02C 5/00* (2006.01)
*G02C 5/22* (2006.01)
(Continued)

(52) U.S. Cl.
CPC ............... *G02C 5/008* (2013.01); *G02C 5/22* (2013.01); *G02B 3/14* (2013.01); *G02C 1/06* (2013.01); *G02C 7/02* (2013.01); *G02F 1/1333* (2013.01)

(58) Field of Classification Search
None
See application file for complete search history.

(56) References Cited

U.S. PATENT DOCUMENTS 5,791,015 A * 8/1998 Wandinger ........... G02C 5/2209
16/386
9,016,855 B2 * 4/2015 Chen ....................... G02C 5/10
351/149

(Continued)

FOREIGN PATENT DOCUMENTS

CN 102566080 A 7/2012
JP 2015522842 A 8/2015
(Continued)

OTHER PUBLICATIONS

International Search Report from International Application No. PCT/JP2019/004292, dated Apr. 23, 2019.
Extended European search report dated Oct. 19, 2021.

*Primary Examiner* — Darryl J Collins
(74) *Attorney, Agent, or Firm* — Brundidge & Stanger, P.C.

(57) ABSTRACT

Provided is eyewear comprising a front piece that has a metallic wraparound end piece and a non-metallic hinge member that constitutes a hinge portion together with the wraparound end piece. Thereby eyewear that is comfortable to wear and has a metallic front piece is provided.

22 Claims, 13 Drawing Sheets

(51) Int. Cl.
G02B 3/14 (2006.01)
G02C 1/06 (2006.01)
G02C 7/02 (2006.01)
G02F 1/1333 (2006.01)

(56) References Cited

U.S. PATENT DOCUMENTS

| | | |
|---|---|---|
| 2010/0265456 A1 | 10/2010 | Matsui |
| 2012/0262667 A1 | 10/2012 | Willey |
| 2013/0010256 A1 | 1/2013 | Haddock |
| 2013/0250233 A1 | 9/2013 | Blum |
| 2013/0308088 A1 | 11/2013 | Senatore et al. |
| 2014/0028966 A1 | 1/2014 | Blum |

FOREIGN PATENT DOCUMENTS

| | | |
|---|---|---|
| WO | 9921046 A1 | 4/1999 |
| WO | 2009081542 A1 | 7/2009 |
| WO | 2012068527 A2 | 5/2012 |
| WO | 2013025933 A1 | 2/2013 |

\* cited by examiner

EYEWEAR

TECHNICAL FIELD

The present invention relates to eyewear.

BACKGROUND ART

Conventionally, eyewear including a lens that includes an electric element, such as a liquid crystal lens with a changing refractive index, driven by application of a driving voltage has been developed (see, Patent Literature (hereinafter, referred to as PTL) 1).

End portions of electrodes of the electric element are exposed in an edge portion of the lens. The electrodes are electrically connected to a control section for controlling the electric element via a conductive section. Such a lens and a conductive section are held in a front made of non-metal.

CITATION LIST

Patent Literature

PTL 1
Japanese Unexamined Patent Application Publication (Translation of PCT Application) No. 2015-522842

SUMMARY OF INVENTION

Technical Problem

With respect to the eyewear as described above, not only eyewear including a front made of non-metal, but also eyewear including a front made of metal that is comfortable to wear are desired.

The present invention has been made in view of such a circumstance, and has an object to provide eyewear including a front made of metal that is comfortable to wear.

Solution to Problem

The eyewear according to the present invention includes: a front including an end piece portion made of metal; and a hinge member made of non-metal and constituting a hinge portion together with the end piece portion.

Advantageous Effects of Invention

According to the present invention, it is possible to provide eyewear that is comfortable to wear and includes a front made of metal.

DESCRIPTION OF EMBODIMENTS

Hereinafter, some embodiments of the present invention will be described in detail with reference to the accompanying drawings. In the following description, electronic glasses including a transparent lens for vision correction which includes a liquid crystal lens (electroactive region) whose optical characteristics can be changed by electrical control will be described as a representative example of the eyewear according to the present invention.

Embodiment 1

Figure 1:
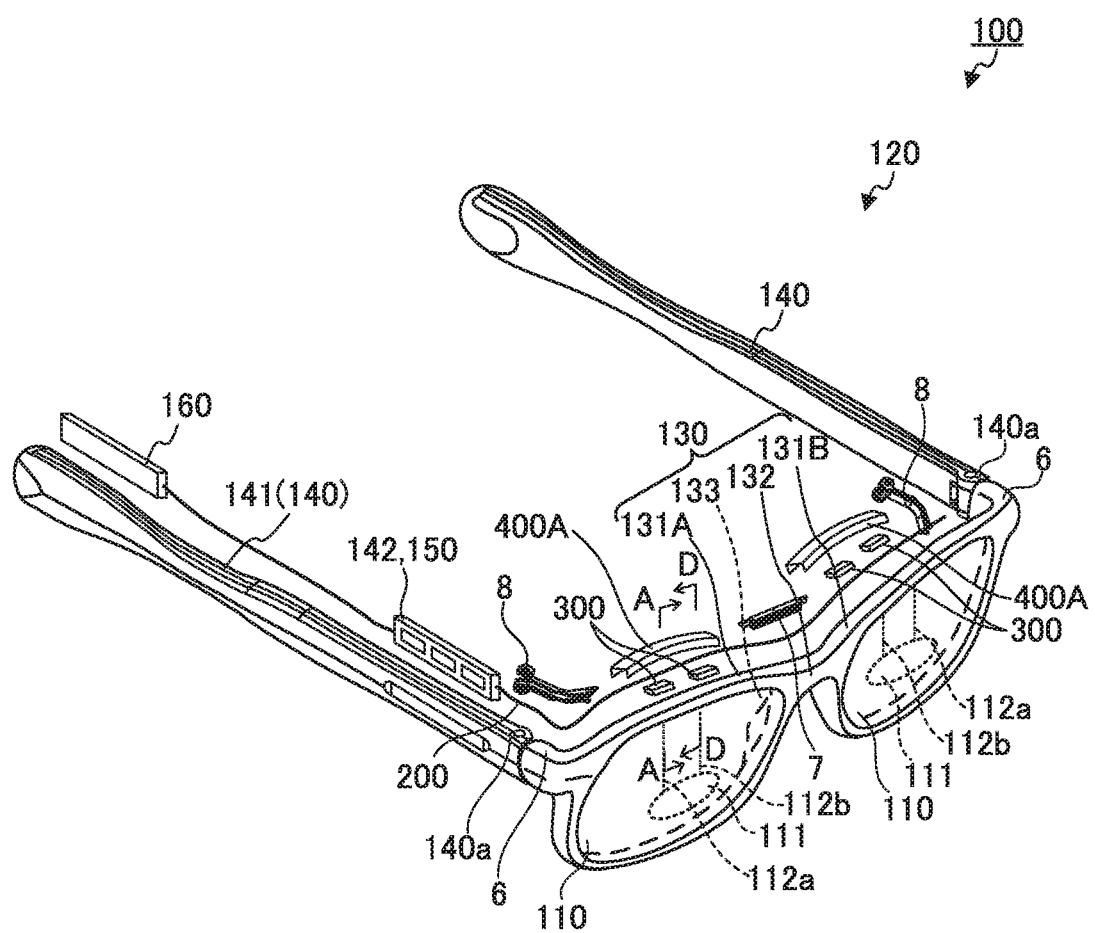
FIG. 1 is an exploded perspective view of electronic glasses according to Embodiment 1 of the present invention.

Electronic glasses 100 according to Embodiment 1 of the present invention will be described with reference to FIGS. 1 to 7D. FIG. 1 is a perspective view illustrating an example of a configuration of electronic glasses 100 according to the present embodiment.

<Electronic Glasses>

Electronic glasses 100 include a pair of lenses 110 and frame 120. Frame 120 includes front 130 and a pair of temples 140. Further, insulation members 400A, flexible substrate 200, and conductive pieces 300 are disposed between front 130 and the pair of lenses 110.

Figure 5A:
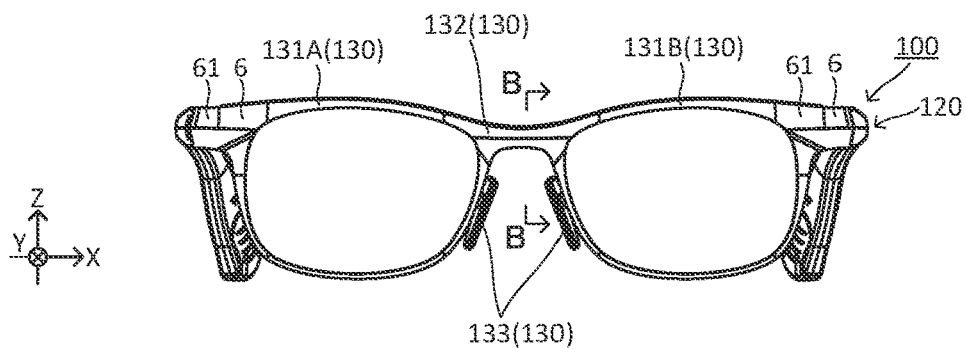
FIG. 5A is a front view of the electronic glasses.
Figure 5B:
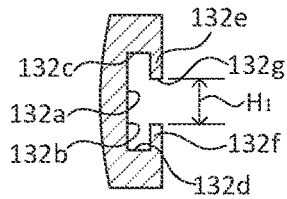
FIG. 5B is a cross-sectional view taken along line B-B of FIG. 5A.
Figure 5C:
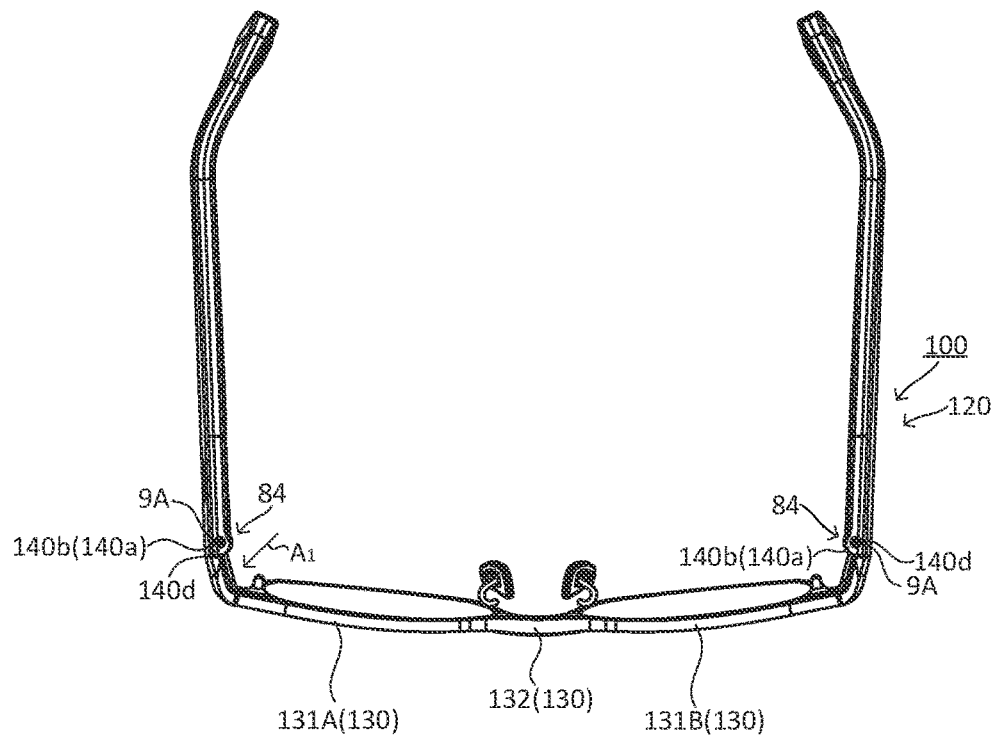
FIG. 5C is a plan view of the electronic glasses.
Figure 5D:
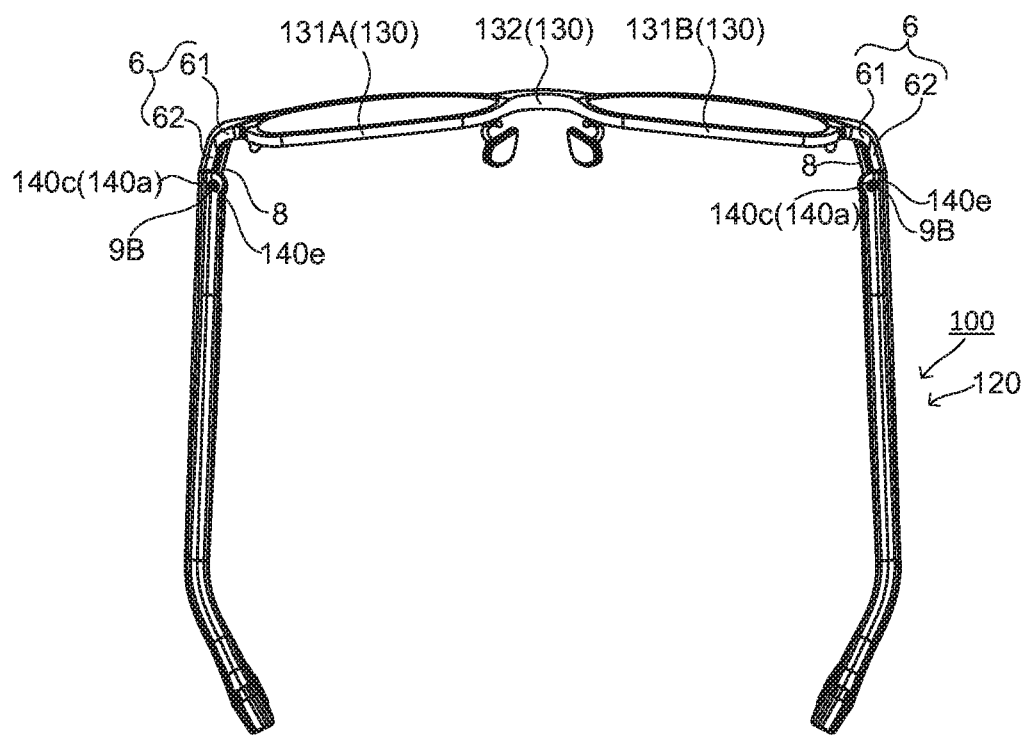
FIG. 5D is a bottom view of the electronic glasses.

In the following description of electronic glasses 100 and constituent members of electronic glasses 100, a width direction, a front-rear direction, and a vertical direction refer to, without otherwise stated, respective directions of electronic glasses 100 in a deployed state (the state illustrated in FIGS. 1 and 5A), which a user can wear as glasses. Specifically, the width direction of the electronic glasses is an X direction of an orthogonal coordinate system illustrated in FIG. 5A. Further, the front-rear direction of the electronic glasses is a Y direction of the orthogonal coordinate system illustrated in FIG. 5A. Further, the vertical direction (top-and-bottom direction) of the electronic glasses is a Z direction of the orthogonal coordinate system illustrated in FIG. 5A. FIG. 5A is a view of electronic glasses 100 viewed from a position forward of electronic glasses 100, and corresponds to a front view of electronic glasses 100 and the constituent members of electronic glasses 100.

<Lens>

The pair of lenses 110 are formed so as to be substantially symmetrical when electronic glasses 100 are viewed in the front view, and lenses 110 include the same components. Further, lenses 110 have the same peripheral structure as well.

Accordingly, in the following description, although details will be described later, a description will be given of lens 110 for the right eye of electronic glasses 100 and the peripheral structure thereof, and a description of lens 110 for the left eye and the peripheral structure thereof will be omitted.

Lens 110 includes liquid crystal lens 111 and a pair of electrodes 112a and 112b. Note that, transparent electrodes such as ITO are used as electrodes 112a and 112b.

Figure 2:
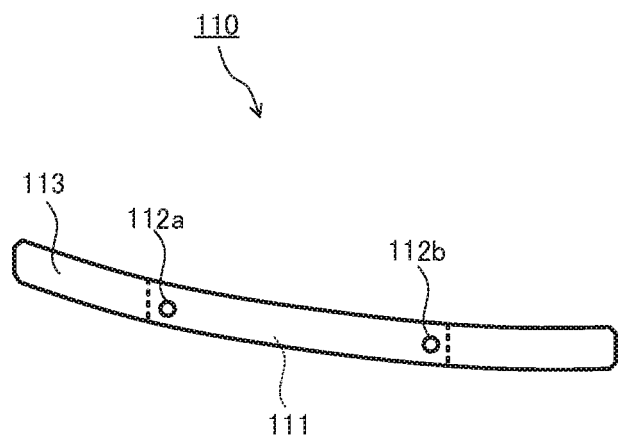
FIG. 2 is a plan view of a lens.

FIG. 2 is a plan view of lens 110 for the right eye. Lens 110 has a multilayer structure in which a plurality of layers are stacked in the thickness direction of lens 110. Lens 110 includes, in a portion in which liquid crystal lens 111 is included, a pair of conductive layers (not illustrated) sandwiching a liquid crystal layer (not illustrated) from the front and rear.

The pair of conductive layers are connected to electrodes 112a and 112b, respectively. When the liquid crystal layer is activated by applying a voltage between the pair of the conductive layers via electrodes 112a and 112b, optical characteristics (such as refractive index) of liquid crystal lens 111 change. Liquid crystal lens 111 corresponds to an example of an optical characteristics changing portion. Note that, the optical characteristics of the optical characteristics changing portion which change by the application of a voltage are not limited to the refractive index. As an example, in a case where the lens is an electrochromic lens, the optical characteristics of the optical characteristics changing portion which change by the application of a voltage may be light transmittance.

Lens 110 includes edge portion 113 that protrudes and surrounds the outer periphery of lens 110. Edge portion 113 includes, in a part thereof, electrode exposure portion 113a (see FIG. 4B) in which end portions of the pair of electrodes 112a and 112b are exposed. Electrode exposure portion 113a includes tip surface 113b, front-side surface 113c, and rear-side surface 113d.

In the case of the present embodiment, edge portion 113 is annular and surrounds the entire outer periphery of lens 110. However, in a case of a structure in which front 130 holds only part of the outer periphery of lens 110, edge portion 113 may be provided only in the part held by front 130 of the outer periphery of lens 110.

Tip surface 113b is preferably a flat surface. Tip surface 113b may be curved so as to be along the outer periphery of lens 110, for example. Each end portion of the pair of electrodes 112a and 112b is exposed from tip surface 113b. Each of electrodes 112a and 112b is disposed so as to sandwich the liquid crystal layer. Each of electrodes 112a and 112b is disposed to be off by the thickness of the liquid crystal layer in the thickness direction of lens 110.

In the case of the present embodiment, front-side surface 113c and rear-side surface 113d are orthogonal to tip surface 113b. Front-side surface 113c and rear-side surface 113d face each other in the front-rear direction and are parallel to each other. The distance between front-side surface 113c and rear-side surface 113d (that is, thickness dimension $W_{113}$ of electrode exposure portion 113a) is constant in the height direction of electrode exposure portion 113a.

Further, thickness dimension $W_{113}$ of electrode exposure portion 113a is constant in a direction along the outer periphery of lens 110. Note that, the shapes of front-side surface 113c and rear-side surface 113d are not limited to the illustrated cases. For example, front-side surface 113c and rear-side surface 113d may be inclined such that thickness dimension $W_{113}$ is larger as front-side surface 113c and rear-side surface 113d are far from tip surface 113b.

Height dimension $H_{113}$ of electrode exposure portion 113a is smaller than depth dimension $D_{131}$ of locking groove 131c of rims 131A and 131B to be described later.

Further, thickness dimension $W_{113}$ of electrode exposure portion 113a is smaller than distance $W_{400}$ between first side plate portion 402 and second side plate portion 403 of insulation member 400A to be described later. A portion other than electrode exposure portion 113a of edge portion 113 may have a thickness dimension larger than distance $W_{400}$ between first side plate portion 402 and second side plate portion 403.

Note that, over the entire circumference, edge portion 113 has a thickness dimension smaller than width $W_{131}$ of locking groove 131c of rims 131A and 131B to be described later. The shape of electrode exposure portion 113a is not limited to the illustrated case. Electrode exposure portion 113a may be a protruding portion having various shapes, formed in parts of the outer peripheral surface of lens 110 in which electrodes 112a and 112b are exposed. Further, electrode exposure portion 113a may be, for example, a recessed portion having various shapes, formed on the outer peripheral surface of lens 110.

The shape of the portion other than electrode exposure portion 113a of edge portion 113 may be the same as or different from that of electrode exposure portion 113a. The shape of the portion other than electrode exposure portion 113a of edge portion 113 may be appropriately determined depending on the shape of locking groove 131c of rims 131A and 131B. In an assembled state, edge portion 113 as described above is disposed in locking groove 131c to be described later.

Note that, the disposition of each of electrodes 112a and 112b and the distance therebetween may vary depending on a lens blank from which lens 110 is cut out, on a cutout position on the lens blank, and on the dimension of a flexible substrate. The distance between the pair of electrodes 112a and 112b is, for example, 10 to 21 mm in a direction along edge portion 113.

<Frame>

Figure 4A:
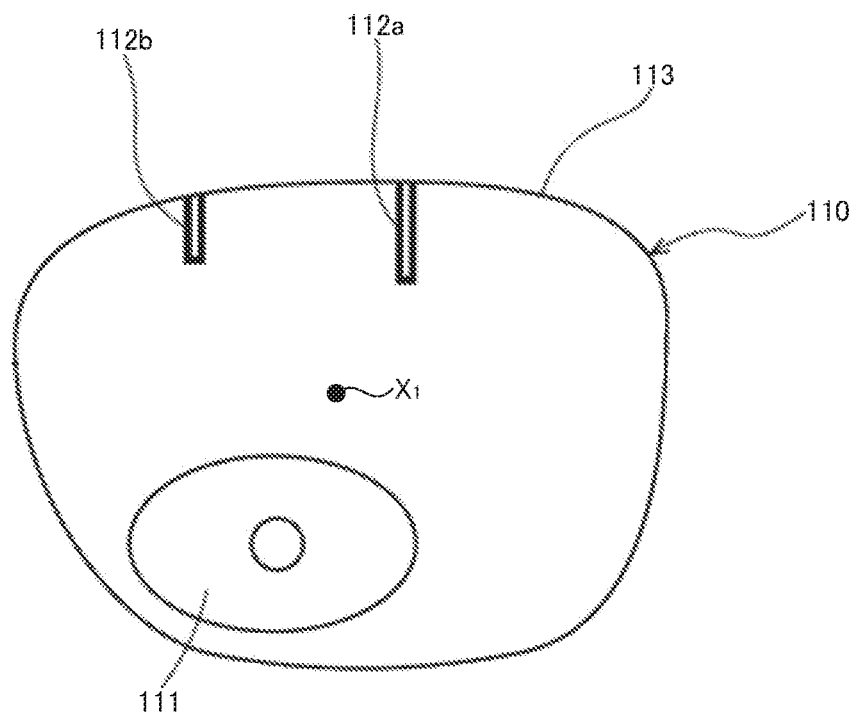
FIG. 4A is a front view of the lens.
Figure 4B:
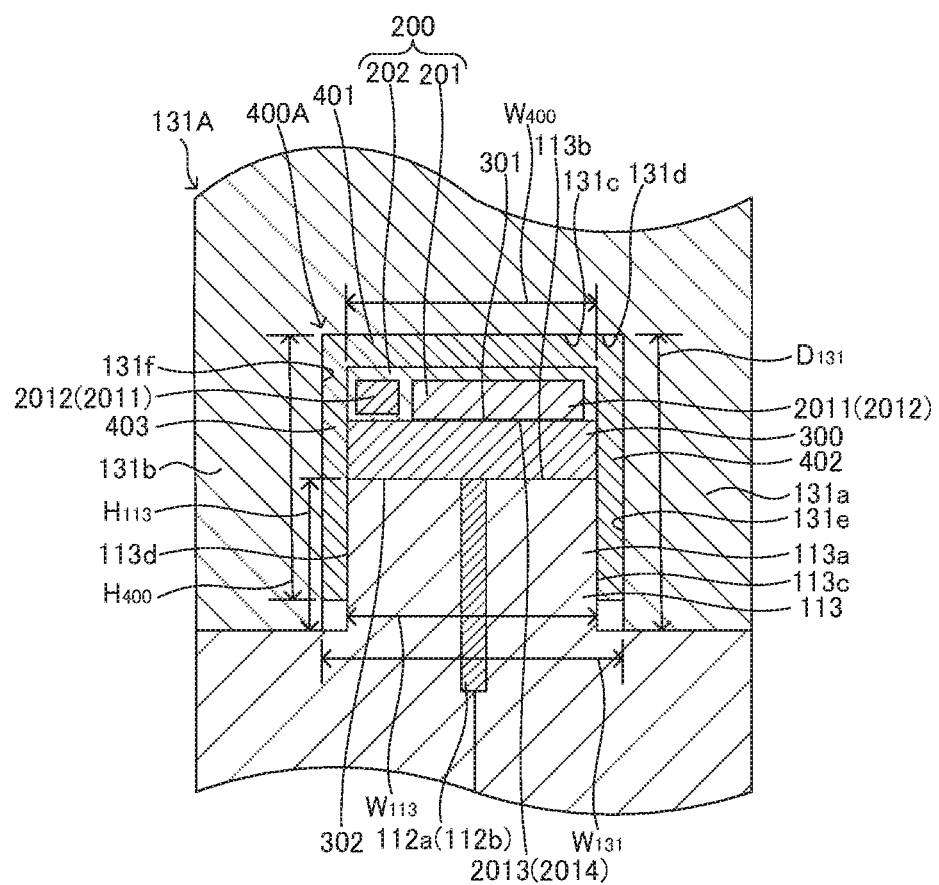
FIG. 4B is a cross-sectional view taken along line A-A of FIG. 1 of the electronic glasses in an assembled state.

Frame 120 and the periphery thereof will be described with reference to FIGS. 1, 4B, and 5A to 5H. FIG. 4B is a cross-sectional view taken along line A-A of FIG. 1.

Frame 120 includes front 130 and the pair of temples 140.

<Front>

Front 130 includes a pair of rims 131A and 131B, bridge 132, cover member 7, a pair of nose pads 133, a pair of end piece portions 6, and hinge member 8.

<Rim>

The pair of rims 131A and 131B hold the pair of lenses 110, respectively. The pair of rims 131A and 131B have a structure symmetrical with each other. The pair of rims 131A and 131B are made of metal. Examples of a metal material constituting the pair of rims 131A and 131B include titanium, aluminum, stainless steel, gold, and alloys thereof. Hereinafter, rim 131A for the right side will be described, and a description of rim 131B for the left side will be omitted.

Rim 131A has an annular shape along the outer shape of lens 110. In a front end portion of the inner peripheral surface of rim 131A, rim 131A includes first covering portion 131a continuous over the entire circumference. First covering portion 131a extends from the inner peripheral surface of rim 131A toward lens 110. In the assembled state, first covering portion 131a as such covers insulation member 400A, flexible substrate 200, and conductive piece 300, all of which will be described later, from the front.

Figure 5E:
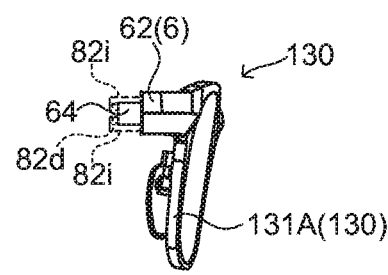
FIG. 5E is a side view of a front.
Figure 5F:
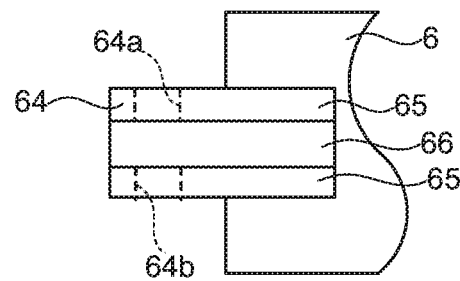
FIG. 5F is a schematic view of a part of an end piece portion of the front viewed from an inside in a width direction.
Figure 5G:
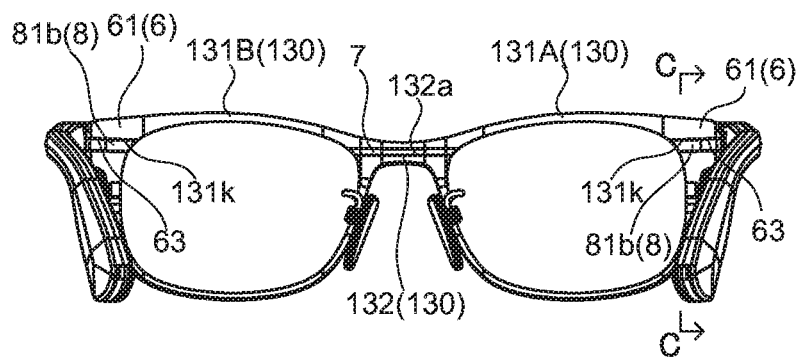
FIG. 5G is a rear view of the electronic glasses.
Figure 5H:
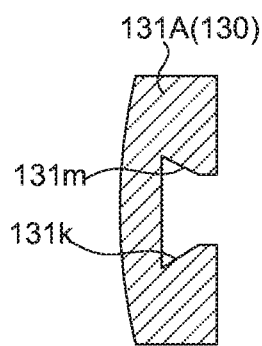
FIG. 5H is a cross-sectional view taken along line C-C of FIG. 5G of the end piece portion.
Figure 5I:
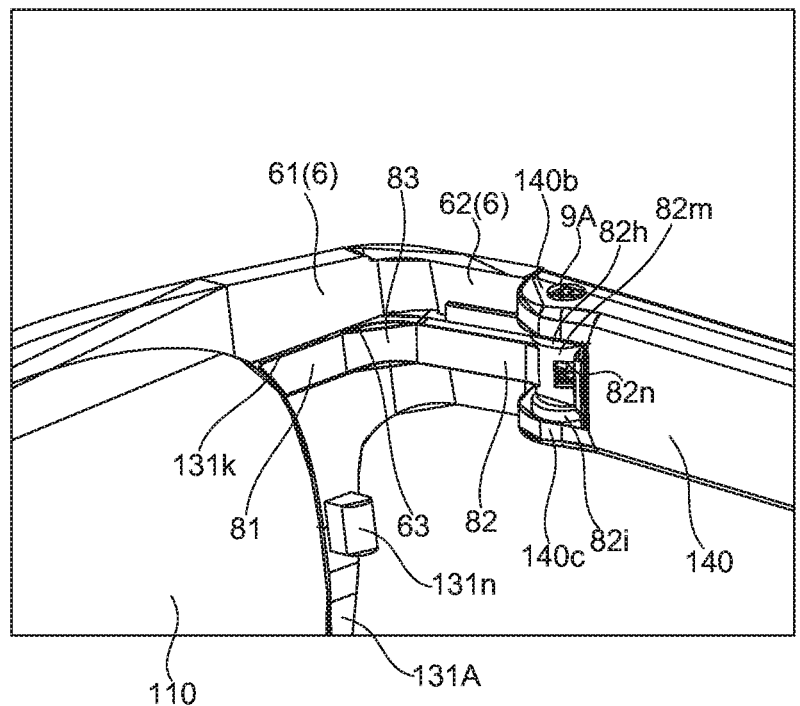
FIG. 5I is a view viewed from an arrow direction $A_1$ of FIG. 5C.
Figure 6A:
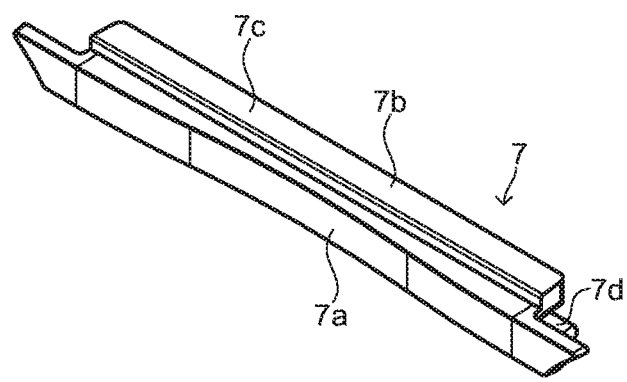
FIG. 6A is a perspective view of a cover member.
Figure 6B:
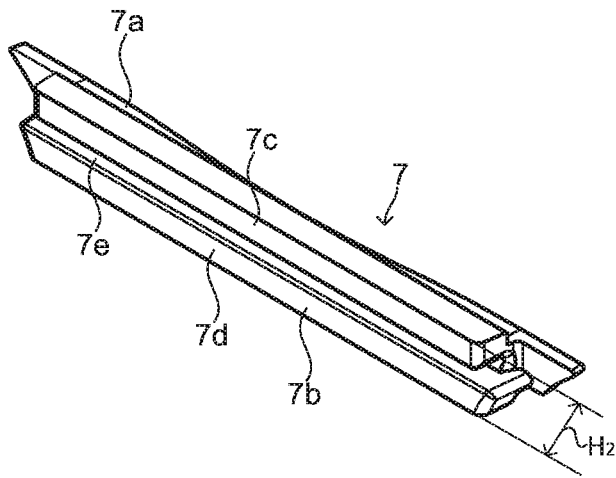
FIG. 6B is a perspective view of the cover member viewed from a different angle from that of FIG. 6A.
Figure 6C:
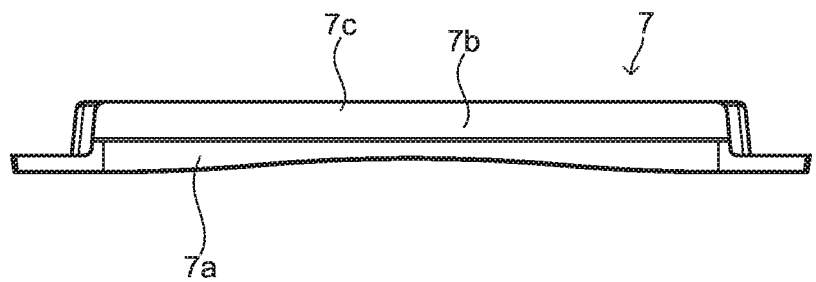
FIG. 6C is a plan view of the cover member.
Figure 7A:
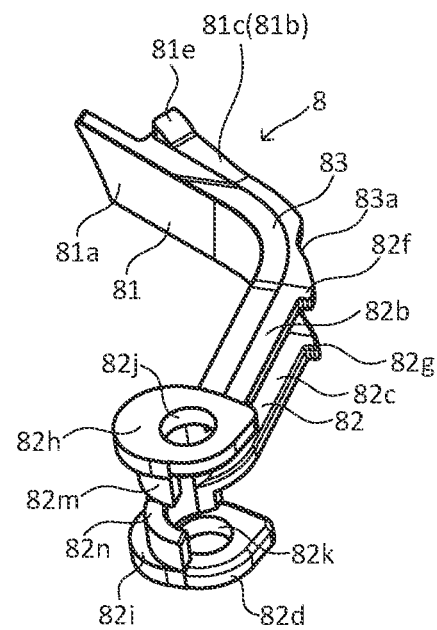
FIG. 7A is a perspective view of a hinge member.
Figure 7B:
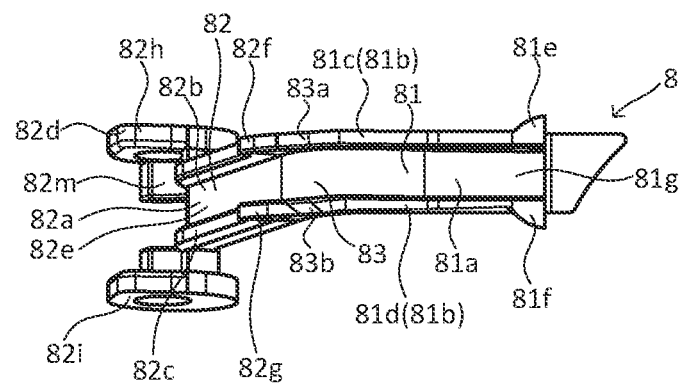
FIG. 7B is a front view of the hinge member.
Figure 7C:
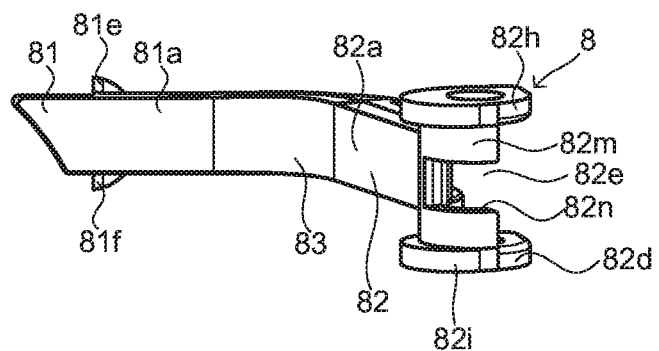
FIG. 7C is a rear view of the hinge member.
Figure 7D:
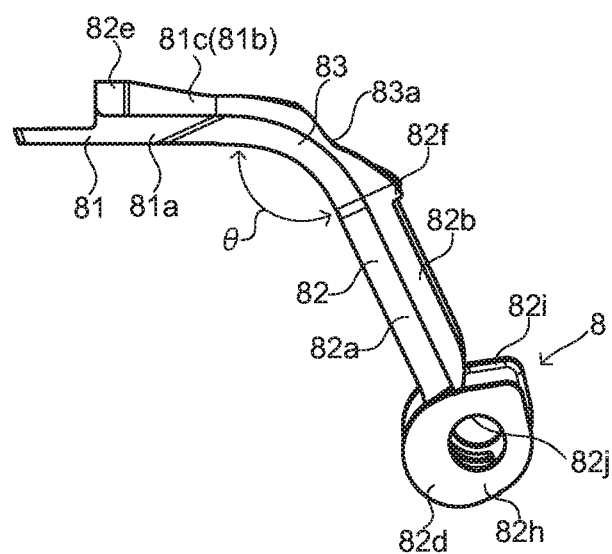
FIG. 7D is a plan view of the hinge member.

Rim 131A includes rim lock 131n (see FIG. 5I). Rim lock 131n couples a discontinuous portion (not illustrated) of rim 131A. An operator inserts lens 110 into rim 131A by releasing rim lock 131n and widening the width of the discontinuous portion of rim 131A. Note that, the position of the rim lock is not limited to the illustrated case. For example, rim lock 131n (the discontinuous portion of rim 131A) may be provided in end piece portion 6 to be described later. Further, rim lock 131n (the discontinuous part of rim 131A) may also constitute a hinge portion together with end piece portion 6 and hinge member 8.

In a rear end portion of the inner peripheral surface of rim 131A, rim 131A includes second covering portion 131b continuous over the entire circumference. Second covering portion 131b extends from the inner peripheral surface of rim 131A toward lens 110. In the assembled state, second covering portion 131b as such covers insulation member 400A, flexible substrate 200, and conductive piece 300, all of which will be described later, from the rear.

Between first covering portion 131a and second covering portion 131b on the inner peripheral surface of rim 131A, rim 131A includes locking groove 131c continuous over the entire circumference. Specifically, locking groove 131c includes bottom surface 131d, first side surface 131e, and second side surface 131f.

First side surface 131e is also a rear-side surface of first covering portion 131a. Further, second side surface 131f is also a front-side surface of second covering portion 131b.

In the case of the present embodiment, locking groove 131c has a rectangular cross-sectional shape in which an end portion on a side close to lens 110 opens. The cross-sectional shape of locking groove 131c corresponds to a cross-sectional shape when rim 131A is cut on a plane including an optical axis $X_1$ (see FIG. 4A) of lens 110.

Note that, the cross-sectional shape of locking groove 131c may be the same or different over the entire circumference. For example, locking groove 131c suffices as long as at least the cross-sectional shape of a portion of locking groove 131c, in which insulation member 400A is disposed (hereinafter, referred to as "disposition portion"), is rectangular as illustrated in FIG. 4B. A portion other than the disposition portion of locking groove 131c may have, for example, a triangular cross-sectional shape in which the groove width is narrower as advancing toward the groove bottom.

In locking groove 131c, in an order from a side close to bottom surface 131d, insulation member 400A, flexible substrate 200, conductive piece 300, all of which will be described later, and edge portion 113 of lens 110 are disposed.

Further, rim 131A includes groove portion 131k (see FIGS. 5G and 5H) extending in the width direction on a rear-side surface of a first end portion in the width direction. Note that, in rims 131A and 131B, the first end portions in the width direction of rims 131A and 131B correspond to end portions opposite to bridge 132, respectively. In rims 131A and 131B, end portions to which bridge 132 is connected correspond to second end portions.

A first end portion of groove portion 131k is connected to a second end portion of first groove portion 63 (see FIG. 5G) of end piece portion 6 to be described later. A second end portion of groove portion 131k opens on the inner peripheral surface of rim 131A. A part (specifically, locking portion 81b of hinge member 8) of hinge member 8 to be described later is locked to groove portion 131k as described above.

Groove portion 131k includes locking portion 131m (see FIG. 5H) that engages with parts (specifically, claw portions 81e and 81f of hinge member 8) of hinge member 8 in the front-rear direction. Locking portion 131m prevents hinge member 8 from slipping out in the front-rear direction.

<Bridge>

Bridge 132 connects the pair of rims 131A and 131B.

Bridge 132 includes groove portion 132a extending in the width direction (see FIGS. 5B and 5G) on the rear-side surface.

Groove portion 132a opens at both ends in the width direction and backward. Specifically, groove portion 132a includes bottom surface portion 132b, upper surface portion 132c, and lower surface portion 132d.

Upper surface portion 132c and lower surface portion 132d face each other in the vertical direction. Groove portion 132a includes upper-side locking portion 132e in a rear end portion of upper surface portion 132c. Upper-side locking portion 132e projects downward from the rear end portion of upper surface portion 132c.

Groove portion 132a includes lower-side locking portion 132f in a rear end portion of lower surface portion 132d. Lower-side locking portion 132f projects upward from the rear end portion of lower surface portion 132d. A tip surface (lower end surface) of upper-side locking portion 132e and a tip surface (upper end surface) of lower-side locking portion 132f face each other in the vertical direction.

In a part between the tip surface (lower end surface) of upper-side locking portion 132e and the tip surface (upper end surface) of lower-side locking portion 132f, groove portion 132a includes rear-side opening portion 132g that opens backward. Cover member 7 to be described later is locked to groove portion 132a as described above.

Bridge 132 as described above is made of metal. Examples of a metallic material constituting bridge 132 include titanium, aluminum, stainless steel, gold, and alloys thereof.

Note that, bridge 132 may be made of non-metal. Examples of a non-metallic material constituting bridge 132 include resins such as polyamide, acetate, celluloid, polyetherimide and polyurethane, and carbon. The material of bridge 132 may be the same as or different from the material of the pair of rims 131A and 131B.

<Cover Member>

Hereinafter, cover member 7 will be described with reference to FIGS. 5G and 6A to 6C. Cover member 7 is made of non-metal such as a synthetic resin, for example. Cover member 7 includes cover element 7a and locking portion 7b.

Cover element 7a is a plate-like member extending in the width direction. Both end edges in the width direction of cover element 7a have shapes along the inner peripheral surfaces of rims 131A and 131B.

Locking portion 7b is provided on a front-side surface of cover element 7a. Locking portion 7b includes first plate portion 7c and second plate portion 7d. First plate portion 7c has a plate shape extending in the width direction. Second plate portion 7d is provided below first plate portion 7c and in parallel to and vertically apart from first plate portion 7c.

In the vertical direction, gap 7e extending in the width direction is provided between first plate portion 7c and second plate portion 7d. In the assembled state illustrated in FIG. 5G, gap 7e faces bottom surface portion 132b of groove portion 132a of bridge 132. A part of flexible substrate 200 is disposed in gap 7e.

Dimension $H_2$ in the vertical direction of locking portion 7b (see FIG. 6B) is larger than dimension $H_1$ (see FIG. 5B) in the vertical direction of rear-side opening portion 132g of bridge 132. Note that, with respect to dimension $H_2$, the distance in the vertical direction between an upper end surface of first plate portion 7c and a lower end surface of second plate portion 7d is the dimension in the thickness direction of locking portion 7b.

Cover member 7 is fixed to bridge 132 by engagement between locking portion 7b and groove portion 132a of bridge 132.

When cover member 7 is locked to groove portion 132a, the operator performs locking by sliding locking portion 7b of cover member 7 into groove portion 132a from openings at both ends in the width direction. Note that, the engagement between locking portion 7b and groove portion 132a of bridge 132 prevents cover member 7 from coming off in the front-rear direction.

In a state in which cover member 7 is incorporated in groove portion 132a of bridge 132 and lenses 110 are incorporated in the pair of rims 131A and 131B, respectively, both end portions of cover member 7 are shaped so as to be along the outer peripheral surface of lens 110 that the both end portions of cover member 7 face (that is, the both end portions of cover member 7 are shaped so as to be along the inner peripheral surfaces of rims 131A and 131B). Further, lens 110 on which cover member 7 abuts may be fixed by cover member 7. Furthermore, it is possible to adjust the strength to fix lens 110 by cover member 7 and/or the connectivity with the electrodes by appropriately determining the rigidity and shape (size) of cover member 7.

<Nose Pad>

A pair of nose pads 133 are disposed at positions in front 130, which can come into contact with the nose of the user. The pair of nose pads 133 are made of non-metal. Examples of a non-metallic material constituting the pair of nose pads 133 include resins such as silicon, polyamide, acetate, celluloid, polyetherimide and polyurethane, and carbon.

Note that, the pair of nose pads 133 may also be made of metal. Examples of a metallic material constituting the pair of nose pads 133 include titanium, aluminum, stainless steel, gold, and alloys thereof. The material of the pair of nose pads 133 may be the same as or different from the material of the pair of rims 131A and 131B.

<End Piece Portion>

Next, a pair of end piece portions 6 will be described with reference to FIGS. 5A to 5H. Note that, of the pair of end piece portions 6, a description will be given hereinafter of end piece portion 6 on the right side to which temple 140 for the right side is coupled. End piece portion 6 on the left side to which temple 140 for the left side is coupled has a structure symmetrical with end piece portion 6 on the right side, and a description of end piece portion 6 on the left side will be therefore omitted.

End piece portion 6 is provided in a first end portion in the width direction of rim 131A for the right side, integrally with rim 131A.

End piece portion 6 is substantially L-shaped. Specifically, end piece portion 6 includes first element 61 extending in the width direction and second element 62 extending in a substantially front-rear direction. First element 61 corresponds to an example of an end piece-side first element. Further, second element 62 corresponds to an example of an end piece-side second element.

A first end portion of first element 61 is connected to the first end portion in the width direction of rim 131A. A second end portion of first element 61 is connected to a front end portion of second element 62.

First element 61 is provided with first groove portion 63 extending in the width direction on a rear-side surface of first element 61. The second end portion of first groove portion 63 is disposed in the vicinity of a connection portion of first element 61 and second element 62. A first end portion of first groove portion 63 is connected to the first end portion of groove portion 131k of rim 131A. A part of hinge member 8 (specifically, locking portion 81b of hinge member 8) to be described later is locked to first groove portion 63.

Second element 62 extends backward from the second end portion of first element 61. Specifically, second elements 62 of the pair of end piece portions 6 are inclined such that the distance therebetween in the width direction increases as advancing backward. Further, as illustrated in FIG. 5F, second element 62 includes a pair of protrusions 65 extending in the front-rear direction on an inner-side surface in the width direction of second element 62.

The pair of protrusions 65 extend in the front-rear direction in a state of being apart from each other in the vertical direction and parallel to each other. Second element 62 includes second groove portion 66 between the pair of protrusions 65 in the vertical direction.

As illustrated in FIGS. 5E and 5F, second element 62 includes first hinge portion 64 in a rear end portion of second element 62. First hinge portion 64 includes a pair of pin support holes 64a and 64b. The pair of pin support holes 64a and 64b respectively open in the vertical direction. Note that, the broken line illustrated in FIG. 5E indicates a part of hinge member 8.

The central axis of pin support hole 64a and the central axis of pin support hole 64b are coaxial. Coupling pins 9A and 9B (see FIGS. 5D and 5C) for coupling end piece portion 6 and temple 140 for the right side are inserted into the pair of pin support holes 64a and 64b, respectively. Coupling pins 9A and 9B may be separate bodies, but may be configured as an integrally coupled pin.

<Hinge Member>

Hereinafter, hinge member 8 will be described with reference to FIGS. 7A to 7D. Hinge member 8 constitutes hinge portion 84 (see FIG. 5C) together with first hinge portion 64.

Hinge portions 84 are for coupling the pair of temples 140 to front 130.

Hinge member 8 is substantially L-shaped. Further, hinge member 8 is made of non-metal such as a synthetic resin. Hinge member 8 as such includes first element 81 and second element 82. First element 81 corresponds to an example of a hinge-side first element. Further, second element 82 corresponds to an example of a hinge-side second element.

First element 81 extends in the width direction. First element 81 includes first cover plate portion 81a and locking portion 81b.

First cover plate portion 81a includes a pair of main surfaces facing in the front-rear direction, and has a plate shape extending in the width direction. A first end portion of first cover plate portion 81*a* is connected to second element 82 (specifically, second cover plate portion 82*a* of second element 82). The first end portion of first cover plate portion 81*a* corresponds to an end portion on a side remote from rim 131A.

A second end portion of first cover plate portion 81*a* is disposed at a position closer to rim 131A than a second end portion of locking portion 81*b* in the width direction. A second end edge of first cover plate portion 81*a* has a shape along the inner peripheral surface of rim 131A.

In other words, in a state in which hinge members 8 are assembled to front 130 and lenses 110 are incorporated in the pair of rims 131A and 131B, respectively, the second end edges of first cover plate portions 81*a* are shaped so as to be along the outer peripheral surfaces of lenses 110 that the second end edges of first cover plate portions 81*a* face.

Note that, lens 110 on which the second end edge of first cover plate portion 81*a* abuts may be fixed by the second end edge of first cover plate portion 81*a*. Furthermore, it is possible to adjust the strength to fix lens 110 by first cover plate portion 81*a* and/or the connectivity with the electrodes by appropriately determining the rigidity and shape (size) of first cover plate portion 81*a*. First cover plate portion 81*a* as such covers first groove portion 63 from the rear.

Locking portion 81*b* includes first plate portion 81*c* and second plate portion 81*d*.

First plate portion 81*c* includes a pair of main surfaces facing in the vertical direction, and has a plate shape extending in the width direction. First plate portion 81*c* is connected to an upper end portion of a front-side surface of first cover plate portion 81*a*. A first end portion of first plate portion 81*c* is connected to a front end portion of first plate portion 82*b* of second element 82.

Second plate portion 81*d* includes a pair of main surfaces facing in the vertical direction, and has a plate shape extending in the width direction. Second plate portion 81*d* is connected to a lower end portion of the front-side surface of first cover plate portion 81*a*. A first end portion of second plate portion 81*d* is connected to a front end portion of second plate portion 82*c* of second element 82.

Gap 81*g* extending in the width direction is provided between first plate portion 81*c* and second plate portion 81*d* in the vertical direction. In the assembled state, gap 81*g* faces a bottom surface of groove portion 131*k* of rim 131A and a bottom surface of first groove portion 63 of end piece portion 6. In the assembled state, a part of flexible substrate 200 is disposed in gap 81*g*. Gap 81*g* corresponds to an example of a first housing portion.

Claw portion 81*e* is provided on an upper-side surface of first plate portion 81*c*. Further, claw portion 81*f* is provided on a lower-side surface of second plate portion 81*d*. Claw portions 81*e* and 81*f* engage with locking portion 131*m* of groove portion 131*k* of rim 131A so that first cover plate portion 81*a* is prevented from coming off in the front-rear direction.

Second element 82 extends in a substantially front-rear direction. In other words, second element 82 extends so as to be along the inner-side surface in the width direction of second element 62 of end piece portion 6. Note that, of both side surfaces in the width direction of end piece portion 6, the inner-side surface in the width direction of end piece portion 6 corresponds to a side surface on a side close to bridge 132.

Second element 82 includes second cover plate portion 82*a*, first plate portion 82*b*, second plate portion 82*c*, and second hinge portion 82*d*.

Second cover plate portion 82*a* includes a pair of main surfaces facing in the width direction, and has a plate shape extending in a substantially front-rear direction. A first end portion (rear end portion) of second cover plate portion 82*a* is connected to second hinge portion 82*d*.

A second end portion (front end portion) of second cover plate portion 82*a* is connected to a first end portion of first element 81 (specifically, first cover plate portion 81*a* of first element 81).

First plate portion 82*b* includes a pair of main surfaces facing in the vertical direction, and has a plate shape extending in a substantially front-rear direction. First plate portion 82*b* as such is connected to an upper end portion of an outer-side surface in the width direction of second cover plate portion 82*a*.

Second plate portion 82*c* includes a pair of main surfaces facing in the vertical direction, and has a plate shape extending in the width direction. Second plate portion 82*c* as such is connected to a lower end portion of the outer-side surface in the width direction of second cover plate portion 82*a*.

Gap 82*e* extending in a substantially front-rear direction is provided between first plate portion 82*b* and second plate portion 82*c* in the vertical direction. A front end of gap 82*e* is connected to gap 81*g* of first element 81. In the assembled state, gap 82*e* faces a bottom surface of second groove portion 66 of second element 62 of end piece portion 6. In the assembled state as such, a part of flexible substrate 200 is disposed in gap 82*e*. Gap 82*e* corresponds to an example of a second housing portion.

First plate portion 81*c* includes claw portion 82*f* at an outer end edge in the width direction. Further, second plate portion 82*c* includes claw portion 82*g* at an outer end edge in the width direction. Claw portions 82*f* and 82*g* face front end edges of the pair of protrusions 65 of end piece portion 6 in the front-rear direction.

A second end portion of first element 81 described above and a second end portion (front end portion) of second element 82 described above constitute connection portion 83 of first element 81 and second element 82. Connection portion 83 is slightly elastically deformable. When connection portion 83 is elastically deformed, angle θ (see FIG. 7D) formed by first element 81 and second element 82 changes slightly.

Hinge member 8 includes recessed portion 83*a* at a tip edge of a connection portion of first plate portions 81*c* and 82*b*. Hinge member 8 includes recessed portion 83*b* at a tip edge of a connection portion of second plate portions 81*d* and 82*c*. Recessed portions 83*a* and 83*b* as such have shapes that may be appropriately determined according to the rigidity of connection portion 83.

Second hinge portion 82*d* is provided integrally in the first end portion (rear end portion) of second cover plate portion 82*a*.

Second hinge portion 82*d* includes a pair of plate portions 82*h* and 82*i* apart from each other in the vertical direction. Plate portions 82*h* and 82*i* include each pin support holes 82*j* and 82*k* vertically penetrating plate portions 82*h* and 82*i*.

Between the pair of plate portions 82*h* and 82*i*, second hinge portion 82*d* includes cover portion 82*m* covering a part of first hinge portion 64 of end piece portion 6.

Second hinge portion 82*d* includes cutout 82*n* through which a part of flexible substrate 200 is inserted. In the case of the present embodiment, cutout 82*n* is provided in cover portion 82*m*.

Hinge member 8 as described above is assembled to end piece portion 6. Specifically, locking portion 81*b* of first element 81 of hinge member 8 is inserted into first groove portion 63 of first element 61 of end piece portion 6.

Claw portions 81e and 81f of locking portion 81b engage with locking portion 131m of groove portion 131k of rim 131A. In this state, first cover plate portion 81a of hinge member 8 covers first groove portion 63 from the rear.

Second element 82 of hinge member 8 covers second groove portion 66 of end piece portion 6 from the inside in the width direction. In this state, claw portions 82f and 82g of second element 82 face the front end edges of the pair of protrusions 65 of end piece portion 6 in the front-rear direction. Such a configuration regulates backward movement of hinge member 8.

Further, the pair of plate portions 82h and 82i of second hinge portion 82d are disposed so as to sandwich first hinge portion 64 of end piece portion 6A from the vertical direction. Further, cover portion 82m of second hinge portion 82d covers a part of first hinge portion 64 of end piece portion 6 from the inside in the width direction. The central axes of pin support holes 82j and 82k of second hinge portion 82d and the central axes of pin support holes 64a and 64b of first hinge portion 64 of end piece portion 6 are coaxial.

<Temple>

The pair of temples 140 have an outer shape substantially symmetrical with each other. Accordingly, hereinafter, temple 140 for the right side will be described, and a description of temple 140 for the left side will be omitted.

Temple 140 as such includes temple-side hinge portion 140a in one end portion (front end portion) of temple 140. Temple-side hinge portion 140a includes a pair of plate portions 140b and 140c (see FIGS. 5C and 5D) facing each other in the vertical direction. The pair of plate portions 140b and 140c include each pin support holes 140d and 140e (see FIGS. 5D and 5C) vertically penetrating the pair of plate portions 140b and 140c.

Temple 140 is assembled to front 130 via temple-side hinge portion 140a. In the assembled state, the pair of plate portions 140b and 140c of temple-side hinge portion 140a are disposed so as to sandwich the pair of plate portions 82h and 82i of second hinge portion 82d from the vertical direction.

In the assembled state, the center axes of pin support holes 140d and 140e are coaxial with the center axes of pin support holes 82j and 82k of second hinge portion 82d and the center axes of pin support holes 64a and 64b of first hinge portion 64 of end piece portion 6.

Coupling pin 9A is inserted through pin support hole 140d of temple 140, pin support hole 82j of second hinge portion 82d, and pin support hole 64a of first hinge portion 64. Further, coupling pin 9B is inserted through pin support hole 140e of temple 140, pin support hole 82k of second hinge portion 82d, and pin support hole 64b of first hinge portion 64.

The central axis of coupling pin 9A and the central axis of coupling pin 9B are coaxial. Hereinafter, coupling pin 9A and coupling pin 9B may be referred to as coupling pin 9. Temple 140 is pivotable around coupling pin 9.

Further, the pair of temples 140 include housings 141. Housings 141 internally house detection section 142, control section 150, power source 160, and a part of flexible substrate 200 (also referred to as flexible printed wiring board or FPC). In the case of the present embodiment, control section 150 and power source 160 are built in housing 141 of temple 140 for the right.

However, control section 150 and power source 160 may be built in housing 141 of temple 140 for the left. Alternatively, control section 150 and power source 160 may be built in housings 141 of the pair of temples 140, respectively.

Housing 141 extends along one direction, and constitutes the outer shape of temple 140. The shape of housing 141 is not particularly limited. In order that the user easily recognizes the position of detection section 142 by merely touching by hand, one portion and the other portion of housing 141 may have shapes different from each other.

In the present embodiment, one portion and the other portion of housing 141 have shapes different from each other. Housing 141 includes a convex stripe on the right-side surface (the outer-side surface of electronic glasses 100). The position corresponding to detection section 142 on the right-side surface of housing 141 has a planar shape. Thus, the user can easily recognize the position in which detection section 142 is disposed.

Temple 140 as described above is made of non-metal. Examples of a non-metallic material constituting temple 140 include resins such as polyamide, acetate, celluloid, polyetherimide and polyurethane, and carbon.

Note that, temple 140 may also be made of metal. Examples of a metallic material constituting temple 140 include titanium, aluminum, stainless steel, gold, and alloys thereof. In a case where temple 140 is made of metal, temple 140 (specifically, housing 141) and detection section 142 are insulated.

The material of temple 140 may be the same as or different from the material of the pair of rims 131A and 131B. Further, from a viewpoint of facilitating the recognition of the position of detection section 142 by the user, one portion and the other portion of housing 141 may be formed of materials different from each other.

<Detection Section>

Detection section 142 is a touch sensor and includes, for example, a contacted portion held in housing 141 and a capacitive detection pad held inside housing 141. As the detection pad, a publicly known detection pad used as a touch sensor can be used. When an object (such as a finger of the user) comes into contact with a contacted portion, detection section 142 detects a change in capacitance resulting from the contact by using the detection pad. Note that, the contacted portion and the detection pad may be physically connected or not connected to each other. Further, the configuration of detection section 142 is not limited to the touch sensor. For example, detection section 142 may be a mechanical switch of a push button type or the like that makes it possible to obtain a physical click feeling.

<Control Section>

Control section 150 is electrically connected to the detection pad of detection section 142 and liquid crystal lens 111. Control section 150 controls a voltage applied to liquid crystal lens 111 to be described later to control the optical characteristics of liquid crystal lens 111.

For example, when detection section 142 detects contact of an object, control section 150 applies a voltage to a pair of liquid crystal lenses 111 or stops the application of the voltage to switch the refractive indices of liquid crystal lenses 111.

Control section 150 includes a control circuit. The control circuit controls, for example, driving of the detection pad, detection of a change in capacitance in the detection pad, and the application of a voltage to liquid crystal lens 111.

Control section 150 is mounted on detection section 142 in a state in which control section 150 is connected to the detection pad so as to be capable of receiving a detection result of a change in capacitance in the detection pad, for example.

<Power Source>

Power source 160 supplies electric power to detection section 142, control section 150, and liquid crystal lenses 111. Power source 160 may be a rechargeable battery pack detachably held in the other end portion (rear end portion) of temple 140. Examples of power source 160 include a nickel-metal hydride rechargeable battery.

<Insulation Member>

Figure 3:
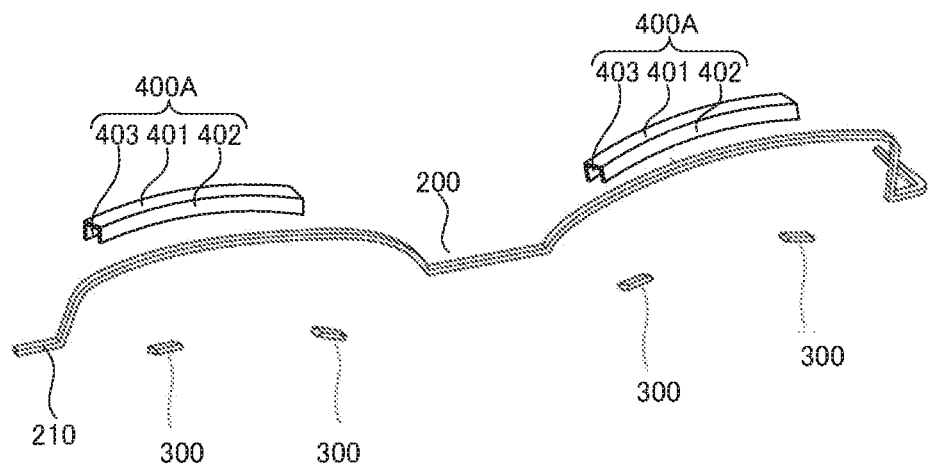
FIG. 3 is a perspective view of a flexible substrate.

FIG. 3 is an exploded perspective view of insulation members 400A, flexible substrate 200, and conductive pieces 300. Hereinafter, insulation member 400A will be described with reference to FIGS. 3 and 4B.

Insulation member 400A is formed of a material having insulation property, such as a resin and rubber, for example, and electrically insulates flexible substrate 200 and conductive piece 300 from front 130. In the case of the present embodiment, insulation member 400A is formed separately from insulation cover 202 of flexible substrate 200 to be described later.

Specifically, insulation member 400A includes bottom plate portion 401 (also referred to as continuous element), first side plate portion 402 (also referred to as first element), and second side plate portion 403 (also referred to as second element).

Bottom plate portion 401 is long in the direction along edge portion 113 of lens 110. Further, bottom plate portion 401 has a length dimension larger than the distance between the pair of electrodes 112a and 112b in the direction along edge portion 113. Bottom plate portion 401 as such is disposed so as to be along bottom surface 131d of locking groove 131c.

First side plate portion 402 is bent at a right angle from a front end portion of bottom plate portion 401 toward lens 110. In the direction along edge portion 113, first side plate portion 402 has a length dimension equal to the length dimension of bottom plate portion 401. First side plate portion 402 as such is disposed along first side surface 131e (the rear-side surface of first covering portion 131a) of locking groove 131c. In this state, first side plate portion 402 is disposed between front-side surface 113c of electrode exposure portion 113a and first side surface 131e of locking groove 131c.

Second side plate portion 403 is bent at a right angle from a rear end portion of bottom plate portion 401 toward lens 110. In the direction along edge portion 113, second side plate portion 403 has a length dimension equal to the length dimension of bottom plate portion 401. Second side plate portion 403 as such is disposed so as to be along second side surface 131f (the front-side surface of second covering portion 131b) of locking groove 131c. In this state, second side plate portion 403 is disposed between rear-side surface 113d of electrode exposure portion 113a and second side surface 131f of locking groove 131c.

Height dimension $H_{400}$ of first side plate portion 402 and second side plate portion 403 is smaller than depth dimension $D_{131}$ of locking groove 131c.

As described above, insulation members 400A are disposed in locking groove 131c. Specifically, insulation members 400A are disposed in parts of locking groove 131c, in which conductive pieces 300 to be described later are disposed.

<Flexible Substrate>

Next, flexible substrate 200 will be described with reference to FIGS. 3 and 4B. Flexible substrate 200 constitutes, together with conductive pieces 300 to be described later, a conductive path in which the pair of electrodes 112a and 112b and control section 150 are electrically connected. Flexible substrate 200 corresponds to an example of a conductive wire.

Specifically, flexible substrate 200 includes conductive layer 201 and insulation cover 202.

Conductive layer 201 includes first conductive wire 2011 and second conductive wire 2012 that are each formed of a conductor such as copper and extend substantially parallel to each other. First conductive wire 2011 and second conductive wire 2012 are insulated by a part of insulation cover 202. The number of conductive wires constituting conductive layer 201 is a number in accordance with the number of electrodes 112a and 112b disposed in edge portion 113 of lens 110.

Note that, the reference signs in the parentheses of FIG. 4B are reference signs corresponding to a cross section taken along line D-D of FIG. 1. That is, in electronic glasses 100 in the assembled state, the dispositions of first conductive wire 2011 and second conductive wire 2012 illustrated in FIG. 4B are replaced with each other on the cross section taken along line D-D of FIG. 1

First conductive wire 2011 constitutes a conductive path between control section 150 and a conductive layer which is one of the pair of conductive layers constituting liquid crystal lens 111 and which is disposed on the rear side (user side). Further, first conductive wire 2011 includes, in a part thereof, first contact portion 2013 (also referred to as conductor surface) exposed to the outside without being covered by insulation cover 202.

First contact portion 2013 is connected to electrode 112a that is one electrode of the pair of electrodes 112a and 112b via conductive pieces 300. In the case of the present embodiment, first contact portion 2013 is provided for each pair of lenses 110.

Second conductive wire 2012 constitutes a conductive path between control section 150 and, of the pair of conductive layers constituting liquid crystal lens 111, the conductive layer disposed on the front side (that is, liquid crystal lens 111). Further, second conductive wire 2012 includes, in a part thereof, second contact portion 2014 (also referred to as conductor surface) exposed to the outside without being covered by insulation cover 202.

Second conductive wire 2012 is connected to electrode 112b that is another electrode of the pair of electrodes 112a and 112b via conductive pieces 300. In the case of the present embodiment, second contact portion 2014 is provided for each pair of lenses 110.

Flexible substrate 200 as described above is connected to control section 150 via connection portion 210 provided at one end of flexible substrate 200.

Flexible substrate 200 has a total length approximately equal to the sum of the distance between the left and right ends of front 130 and the distance between front 130 and control section 150. That is, flexible substrate 200 has an elongated shape as a whole.

Flexible substrate 200 has a width dimension smaller than the width dimension (the thickness dimension in the front-rear direction) of front 130 in the entire area of flexible substrate 200. Further, the width dimension of flexible substrate 200 is, at least in parts overlapping with insulation members 400A, smaller than the distance between first side plate portion 402 and second side plate portion 403. Flexible substrate 200 may have the same width in the entire area of flexible substrate 200. The width of flexible substrate 200 is, for example, 1 mm or more and 5 mm or less.

Flexible substrate 200 is disposed inside temples 140, between front 130 and lenses 110, and inside, under or behind bridge 132 so as to extend along temples 140 and front 130.

Flexible substrate 200 is disposed in locking groove 131c of the pair of rims 131A and 131B between front 130 and lenses 110. In this state, first contact portion 2013 of flexible substrate 200 faces an end portion of electrode 112a that is the one electrode and is exposed from edge portion 113. Second contact portion 2014 of flexible substrate 200 faces an end portion of electrode 112b that is the other electrode and is exposed from edge portion 113.

<Conductive Piece>

Conductive piece 300 is formed of a material having flexibility and conductivity, such as conductive rubber, for example. Herein, having flexibility means that the Young's modulus is smaller than those of lens 110 and front 130.

Conductive piece 300 includes first connection surface 301, and second connection surface 302 facing first connection surface 301. Further, conductive piece 300 has a width dimension that enables conductive piece 300 to be disposed in a space existing between first side plate portion 402 and second side plate portion 403 of insulation member 400A.

Conductive piece 300 as such is disposed between first contact portion 2013 and the end portion of electrode 112a that is the one electrode and is exposed from edge portion 113. In a state of disposition as such, first connection surface 301 abuts on first contact portion 2013, and second connection surface 302 abuts on the end portion of electrode 112a that is the one electrode, respectively. In this state, conductive piece 300 is pressed by first contact portion 2013 and tip surface 113b of electrode exposure portion 113a.

Conductive piece 300 is also disposed between second contact portion 2014 and the end portion of electrode 112b that is the other electrode and is exposed from edge portion 113. In a state of disposition as such, first connection surface 301 abuts on first contact portion 2013, and second connection surface 302 abuts on the end portion of electrode 112b that is the other electrode, respectively. In this state, conductive piece 300 is pressed by second contact portion 2014 and tip surface 113b of electrode exposure portion 113a.

In this manner, conductive piece 300 conducts first conductive wire 2011 and second conductive wire 2012 with electrode 112a and electrode 112b.

Conductive piece 300 is attached to first contact portion 2013 and second contact portion 2014 with a double-sided tape, for example. In this case, the double-sided tape naturally has a dimension that does not prevent conduction between conductive piece 300 and first contact portion 2013 and second contact portion 2014.

Operation and Effects of Present Embodiment

According to the present embodiment having the above-described configuration, it is possible to provide eyewear that is comfortable to wear and includes a front made of metal. That is, in the case of the present embodiment, hinge portions 84 of front 130, which couple front 130 and temples 140, are each composed of end piece portion 6 made of metal, and hinge member 8 made of synthetic resin. Since hinge members 8 as such have elasticity, a force to sandwich the user's head can be adjusted moderately by temples 140 in a state in which electronic glasses 100 are mounted. Accordingly, comfortableness to wear electronic glasses 100 in the mounted state becomes soft.

Further, in a case where hinge member 8 and cover member 7 are made of metal, the processing may be difficult and the manufacturing cost may be increased. On the other hand, since hinge member 8 and cover member 7 are made of synthetic resin according to the present embodiment, the processing is easy and the manufacturing cost can be reduced in comparison with hinge member 8 and cover member 7 that are made of metal.

Further, hinge member 8 and cover member 7 that are made of synthetic resin are lighter than hinge member 8 and cover member 7 that are made of metal, and therefore contribute to weight reduction of electronic glasses 100 as a whole.

Further, connection portion 83 of first element 81 and second element 82 of hinge member 8 made of synthetic resin is elastically deformable such that angle θ (see FIG. 7D) formed by first element 81 and second element 82 slightly changes. Connection portion 83 as such is capable of reducing an impact applied to front 130 by absorbing a force transmitted from temples 140 to front 130. Such operation contributes to improvement in the durability of front 130, and makes it possible to lengthen the product life of electronic glasses 100.

Further, hinge member 8 and cover member 7 that are made of synthetic resin include easily replaceable parts and therefore contribute to reduction of maintenance cost of electronic glasses 100.

Embodiment 2

Figure 8:
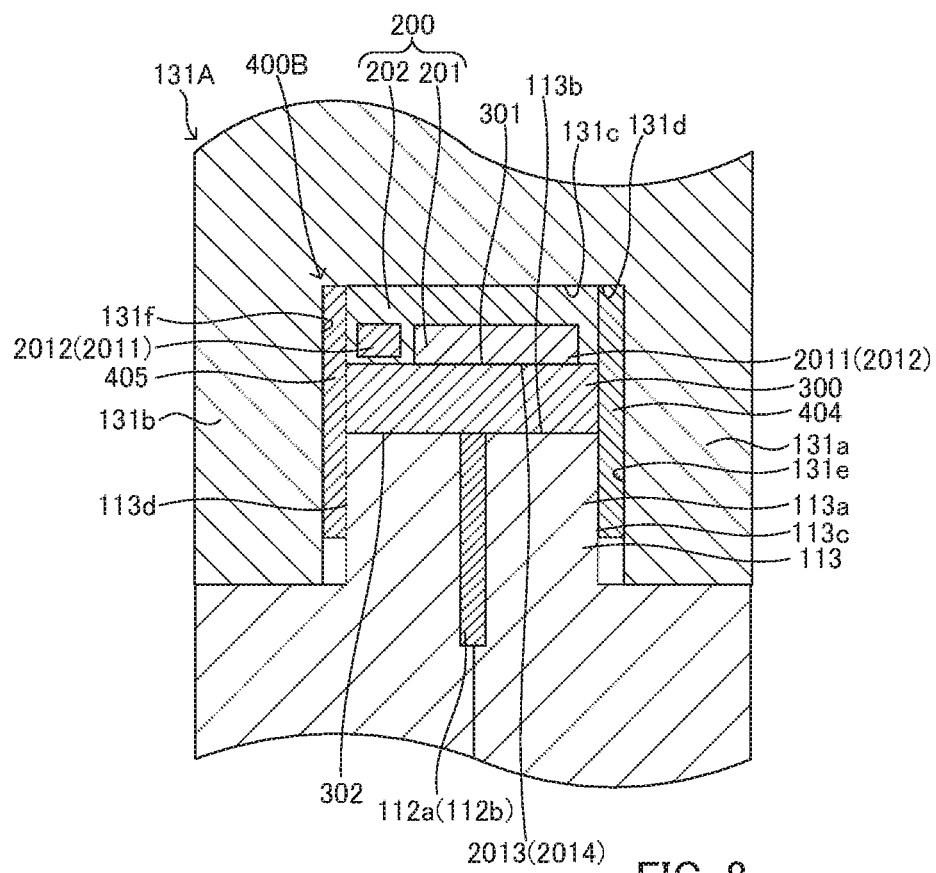
FIG. 8 is a cross-sectional view taken along line A-A of FIG. 1 of electronic glasses according to Embodiment 2 of the present invention.

Embodiment 2 according to the present invention will be described with reference to FIG. 8. FIG. 8 is a diagram corresponding to FIG. 4B referred to in the description of Embodiment 1 described above. In electronic glasses according to the present embodiment, the structure of insulation member 400B differs from that of insulation member 400A of Embodiment 1. Hereinafter, the electronic glasses of the present embodiment will be described mainly with respect to the structure of the part different from Embodiment 1.

Insulation member 400B includes first insulation film 404 and second insulation film 405.

First insulation film 404 is a coating film formed on first side surface 131e (which is also the rear-side surface of first covering portion 131a) of locking groove 131c of the pair of rims 131A and 131B.

Second insulation film 405 is a coating film formed on second side surface 131f (which is also the front-side surface of second covering portion 131b) of locking groove 131c of the pair of rims 131A and 131B. First insulation film 404 and second insulation film 405 are formed by applying and curing a paste-like material having insulation property. As a method for forming first insulation film 404 and second insulation film 405, a publicly known coating film-forming method can be employed.

Note that, first insulation film 404 and second insulation film 405 may also be formed by attaching a sheet-like insulation member to first side surface 131e and second side surface 131f.

In the case of the present embodiment, insulation member 400B is not disposed between flexible substrate 200 and bottom surface 131d. However, since insulation cover 202 of flexible substrate 200 has insulation property, conductive layer 201 of flexible substrate 200 is insulated from the pair of rims 131A and 131B. Other structures, operation and effects are the same as in Embodiment 1 described above.

Embodiment 3

Figure 9:
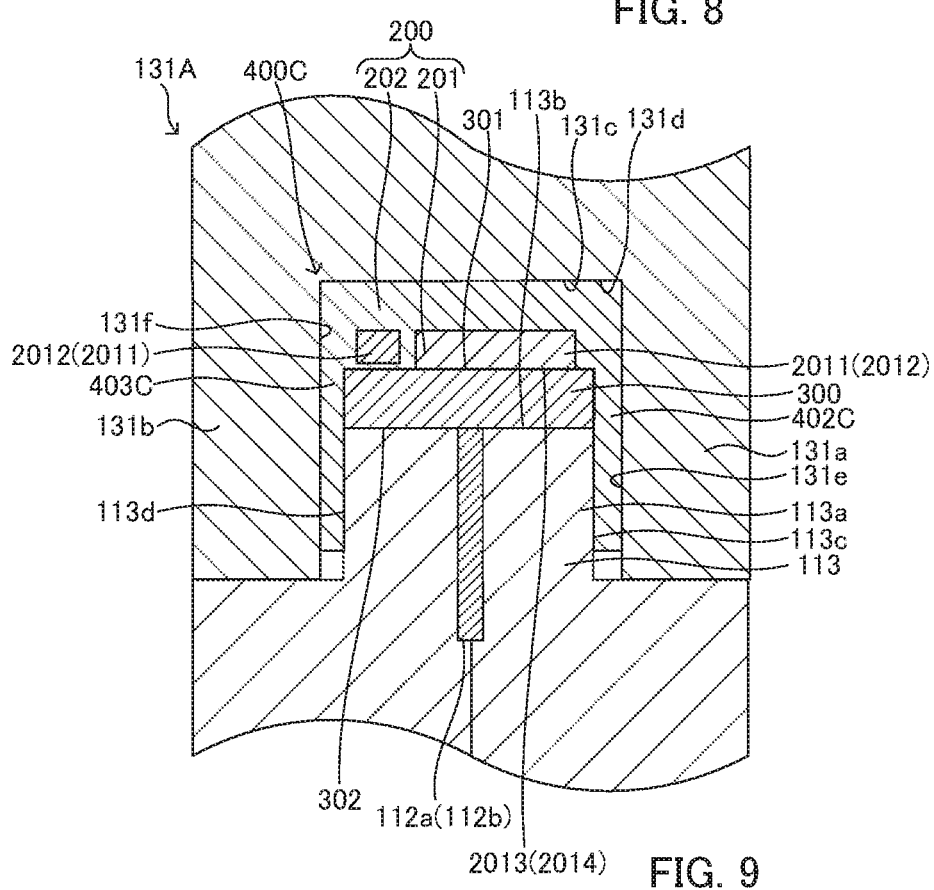
FIG. 9 is a cross-sectional view taken along line A-A of FIG. 1 of electronic glasses according to Embodiment 3 of the present invention.

Embodiment 3 according to the present invention will be described with reference to FIG. 9. FIG. 9 is a diagram corresponding to FIG. 4B referred to in the description of Embodiment 1 described above. In electronic glasses according to the present embodiment, the structure of insulation member 400C differs from that of insulation member 400A of Embodiment 1. Hereinafter, the electronic glasses of the present embodiment will be described mainly with respect to the structure of the part different from Embodiment 1.

In the case of the present embodiment, insulation member 400C includes first side plate portion 402C and second side plate portion 403C. First side plate portion 402C and second side plate portion 403C have substantially the same configurations as those of Embodiment 1 described above, and each one end portion thereof (an end portion on a side remote from lens 110) is formed integrally with insulation cover 202 of flexible substrate 200.

In other words, insulation cover 202 includes first side plate portion 402C and second side plate portion 403C at least in a front end portion and a rear end portion of a part overlapping with conductive piece 300. First side plate portion 402C and second side plate portion 403C are formed by being bent at a right angle from the front end portion and rear end portion of insulation cover 202 toward lens 110. Other structures, operation and effects are the same as in Embodiment 1 described above.

Embodiment 4

Figure 10:
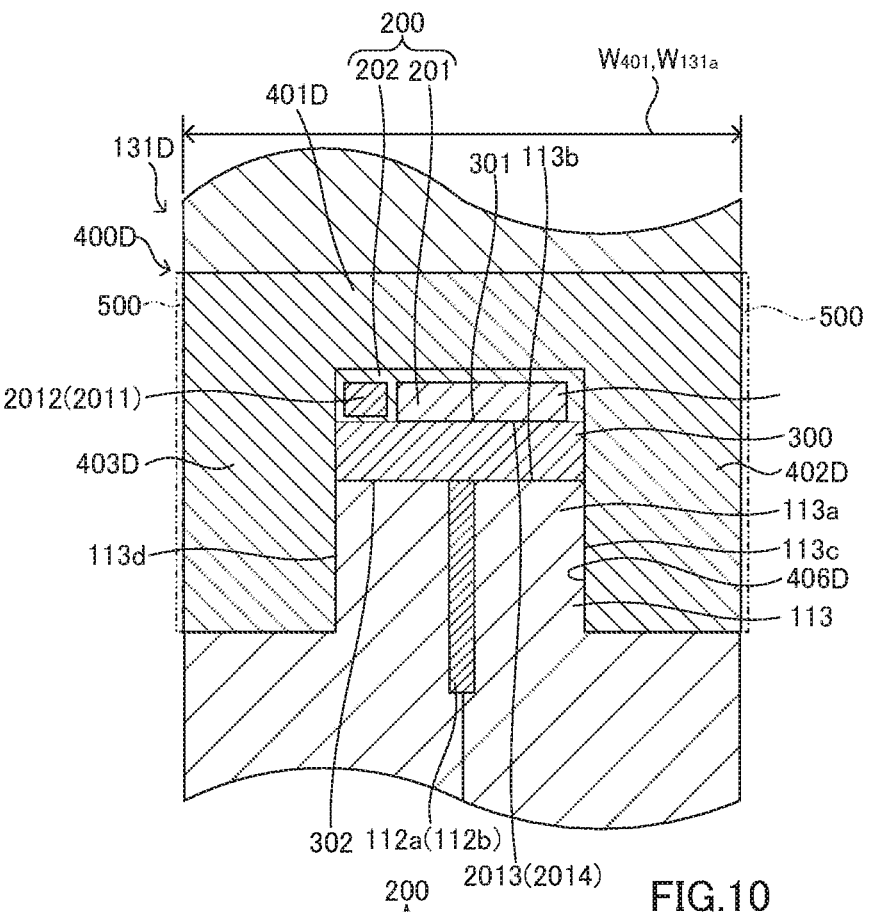
FIG. 10 is a cross-sectional view taken along line A-A of FIG. 1 of electronic glasses according to Embodiment 4 of the present invention.

Embodiment 4 according to the present invention will be described with reference to FIG. 10. FIG. 10 is a diagram corresponding to FIG. 4B referred to in the description of Embodiment 1 described above. In electronic glasses according to the present embodiment, the structures of rim 131D and insulation member 400D differ from those of rim 131A and insulation member 400A of Embodiment 1. Hereinafter, the electronic glasses of the present embodiment will be described mainly with respect to the structures of the parts different from Embodiment 1. Note that, rim 131D is the rim for the right side. Since the rim for the left side has a structure symmetrical with rim 131D for the right side, a description of the rim for the left side will be omitted.

Rim 131D is made of metal, and has an annular shape so as to be along the outer shape of lens 110. In the case of the present embodiment, the inner peripheral surface of rim 131D is curved so as to be along the outer shape of lens 110. The inner peripheral surface of rim 131D as such does not include locking groove 131c (see FIG. 4B) included by rim 131A of Embodiment 1 described above.

Insulation member 400D includes bottom plate portion 401D, first side plate portion 402D, and second side plate portion 403D. Insulation member 400D is made of a member having insulation property. Examples of a material of insulation member 400D include resins such as polyamide, acetate, celluloid, polyetherimide, and polyurethane.

Bottom plate portion 401D has an annular shape so as to be along the inner peripheral surface of rim 131D. Thickness dimension $W_{401}$ in the front-rear direction of bottom plate portion 401D is equal to thickness dimension $W_{131a}$ in the front-rear direction of the inner peripheral surface of rim 131D.

First side plate portion 402D extends perpendicularly from a front end portion of bottom plate portion 401D toward lens 110. First side plate portion 402D is provided over the entire length of bottom plate portion 401D.

Second side plate portion 403D extends perpendicularly from a rear end portion of bottom plate portion 401D toward lens 110. Second side plate portion 403D is provided over the entire length of bottom plate portion 401D. Note that, first side plate portion 402D and second side plate portion 403D correspond to first covering portion 131a and second covering portion 131b in Embodiment 1 described above.

Insulation member 400D as such is fixed to rim 131D by an adhesive (not illustrated) applied between the outer peripheral surface of bottom plate portion 401D and the inner peripheral surface of rim 131D.

Further, insulation member 400D includes accommodation portion 406D in a part surrounded from three sides by bottom plate portion 401D, first side plate portion 402D, and second side plate portion 403D. Accommodation portion 406D corresponds to locking groove 131c in Embodiment 1 described above. In accommodation portion 406D, flexible substrate 200, conductive piece 300, and edge portion 113 (electrode exposure portion 113a) are disposed in the same manner as in locking groove 131c of Embodiment 1.

Note that, a front-side surface (the right-side surface in FIG. 10) of first side plate portion 402D may be provided with covering member 500 that is e.g. a metallic tone coating film or seal. Covering member 500 may also be provided on a rear-side surface (the left-side surface in FIG. 10) of first side plate portion 402D. Other structures, operation, and effects are the same as in Embodiment 1 described above.

Embodiment 5

Figure 11:
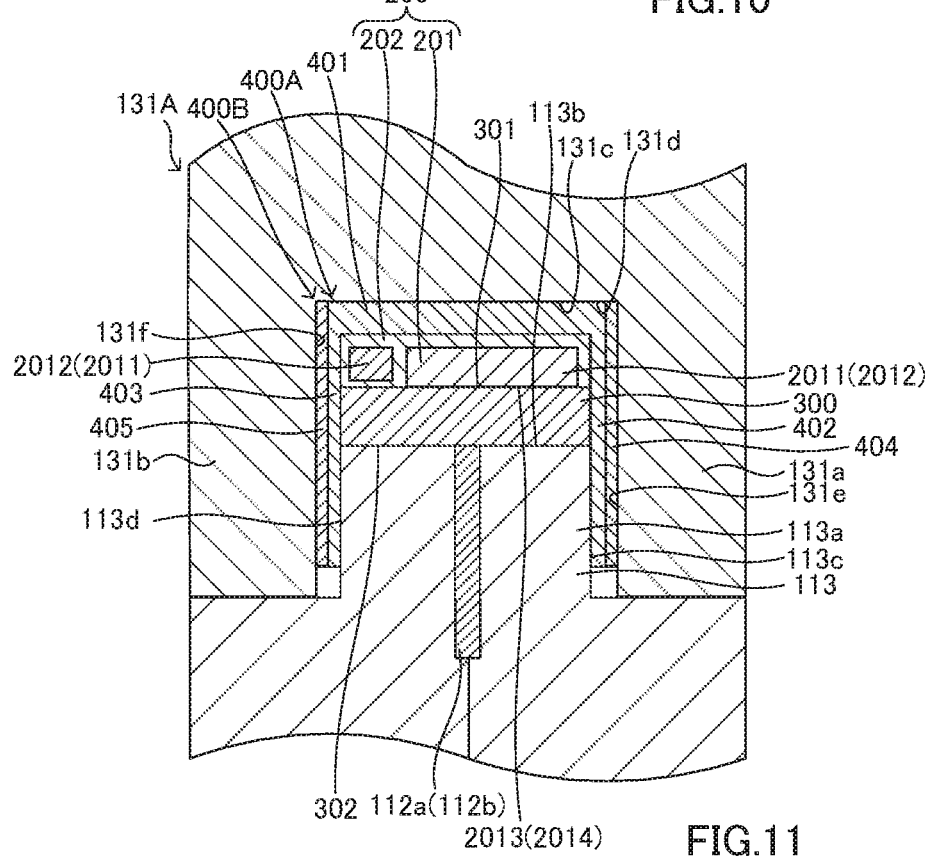
FIG. 11 is a cross-sectional view taken along line A-A of FIG. 1 of electronic glasses according to Embodiment 5 of the present invention.

Embodiment 5 according to the present invention will be described with reference to FIG. 11. FIG. 11 is a diagram corresponding to FIG. 4B referred to in the description of Embodiment 1 described above. In the case of electronic glasses according to the present embodiment, an insulation member is composed of insulation member 400A of Embodiment 1 and insulation member 400B (also referred to as second insulator) of Embodiment 2. Other structures, operation, and effects are the same as in Embodiments 1 and 2.

Embodiment 6

Embodiment 6 according to the present invention will be described with reference to FIGS. 12 and 13.

In electronic glasses according to the present embodiment, the structure of rim 131E differs from that of rim 131A of Embodiment 1. Hereinafter, the electronic glasses of the present embodiment will be described mainly with respect to the structure of the part different from Embodiment 1. Note that, rim 131E is the rim for the right side of the electronic glasses. Since the rim for the left side has a shape symmetrical with rim 131E, a description of the rim for the left side will be omitted.

Figure 12:
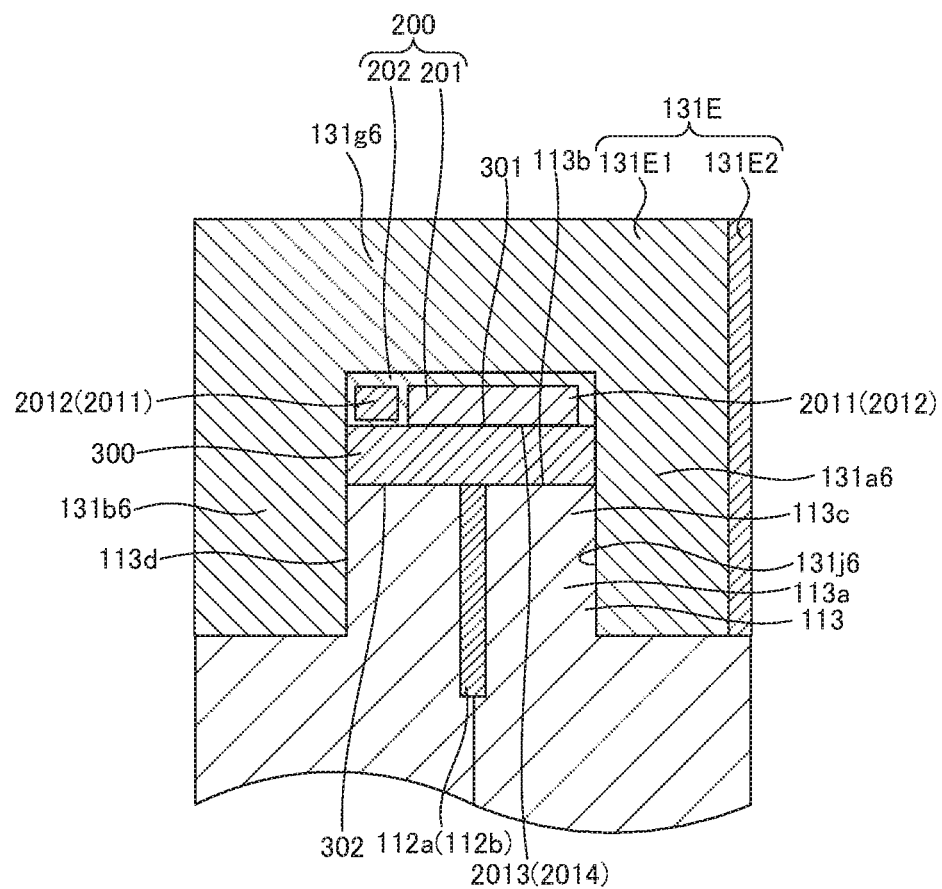
FIG. 12 is a cross-sectional view taken along line A-A of FIG. 1 of electronic glasses according to Embodiment 6 of the present invention.

FIG. 12 is a diagram corresponding to FIG. 4B referred to in the description of Embodiment 1 described above. Further, FIG. 13 is a cross-sectional view of rim 131E at a position different from that of FIG. 12. Rim 131E has an annular shape so as to be along the outer shape of lens 110 (see FIG. 1). Rim 131E as such includes first rim element 131E1 and second rim element 131E2. Note that, first rim element 131E1 is a first front element. Second rim element 131E2 is a second front element.

First rim element 131E1 is made of non-metal. Examples of a non-metallic material constituting first rim element 131E1 include resins such as polyamide, acetate, celluloid, polyetherimide, and polyurethane. In the case of the present embodiment, first rim element 131E1 is a first insulator. In other words, in the case of the present embodiment, the first insulator constitutes a part of rim 131E.

First rim element 131E1 is a hollow annular member so as to be along the outer shape of lens 110. First rim element 131E1 includes first covering portion 131a6, second covering portion 131b6, first connection portion 131g6, and second connection portion 131h6.

Figure 13:
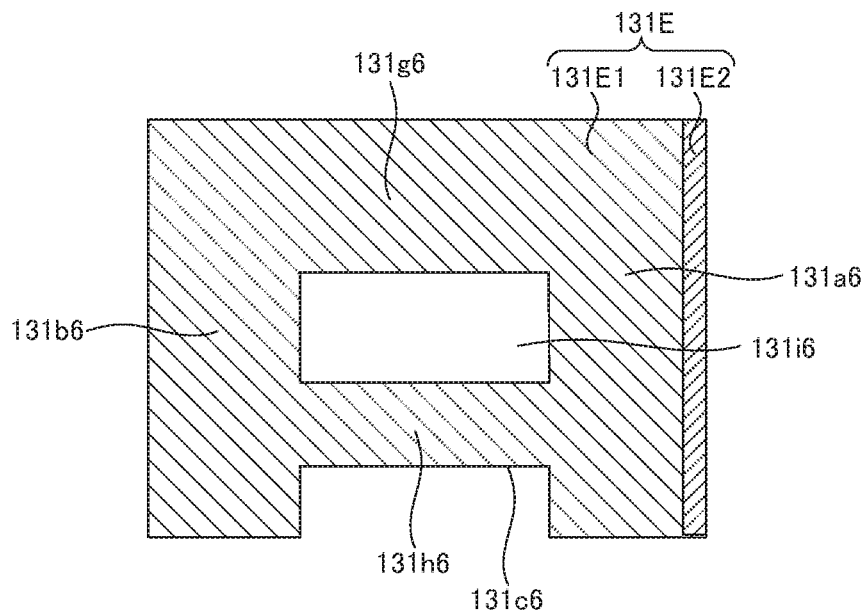
FIG. 13 is a cross-sectional view of a rim at a position different from that of FIG. 12.

First covering portion 131a6, second covering portion 131b6, first connection portion 131g6, and second connection portion 131h6 are connected to each other in a substantially rectangular cross-sectional shape as illustrated in FIG. 13 to form first rim element 131E1 that is hollow and annular.

First rim element 131E1 includes accommodation portion 131i6 in a part surrounded by first covering portion 131a6, second covering portion 131b6, first connection portion 131g6, and second connection portion 131h6. In the assembled state, accommodation portion 131i6 accommodates flexible substrate 200 and conductive piece 300.

That is, in the assembled state, first covering portion 131a6 covers flexible substrate 200 and conductive piece 300 from the front. First covering portion 131a6 is also a first element of the first insulator. Further, in the assembled state, second covering portion 131b6 covers flexible substrate 200 and conductive piece 300 from the rear. Second covering portion 131b6 is also a second element of the first insulator.

First connection portion 131g6 connects one end (the upper end in FIG. 13) of first covering portion 131a6 and one end of second covering portion 131b6.

Second connection portion 131h6 connects a portion closer to another end (the lower end in FIG. 13) of first covering portion 131a6 and a portion closer to another end of second covering portion 131b6. In the assembled state, second connection portion 131h6 includes through-hole 131j6 in a part corresponding to electrode exposure portion 113a. Electrode exposure portion 113a is inserted into through-hole 131j6.

In a part surrounded from three sides by first covering portion 131a6, second covering portion 131b6, and second connection portion 131h6 on the inner peripheral surface, first rim element 131E1 includes locking groove 131c6 continuous over the entire circumference. Edge portion 113 of lens 110 is disposed in locking groove 131c6.

Conductive piece 300 is disposed between flexible substrate 200 and tip surface 113b of electrode exposure portion 113a in the case of the present embodiment as well. Specifically, conductive piece 300 is disposed between first contact portion 2013 of flexible substrate 200 and the end portion of electrode 112a that is the one electrode and is exposed from edge portion 113. Conductive piece 300 is the same as in Embodiment 1 described above.

In a state of disposition as such, first connection surface 301 of conductive piece 300 abuts on first contact portion 2013, and second connection surface 302 abuts on the end portion of electrode 112a that is the one electrode, respectively. In this state, conductive piece 300 is pressed by first contact portion 2013 and tip surface 113b of electrode exposure portion 113a.

Second rim element 131E2 is made of metal. Examples of a metal material constituting second rim element 131E2 include titanium, aluminum, stainless steel, gold, and alloys thereof.

Second rim element 131E2 is a circular-ring-shaped member along a front-side surface of first covering portion 131a6. Second rim element 131E2 as such adheres and is fixed to the front-side surface of first covering portion 131a6. Note that, a third rim element (not illustrated) having a circular ring shape may adhere and be fixed to a rear-side surface of second covering portion 131b6.

Other configurations, operation and effects are the same as in Embodiment 4 described above. Note that, the configuration of the present embodiment may be implemented in appropriate combination with the embodiments described above as long as no technical inconsistency occurs.

<Additional Note>

Although the embodiments of the present invention have been described thus far, the present invention is not limited to the above-described embodiments, and various modifications can be made without departing from the spirit of the present invention. For example, the eyewear according to the present invention encompasses glasses (including electronic glasses and sunglasses) and goggles both of which have an auxiliary mechanism for improving the user's vision, such as vision correction lenses. Further, the eyewear according to the present invention encompasses various devices (for example, glasses-type wearable glass terminals, head-mounted displays and the like) having a mechanism that presents information to the user's field of vision or eyes.

Further, the eyewear according to the present invention may be configured to be capable of holding an auxiliary mechanism for improving vision or field of vision, a mechanism for presenting information, and/or the like in front of or around the user's eyes. The eyewear according to the present invention is not limited to a glasses type that can be hooked on both ears, but may be a type that is mounted on the head, one ear or the like. Further, the eyewear according to the present invention is not limited to eyewear for both eyes, but may be eyewear for one eye.

Further, each lens in the eyewear according to the present invention may include a plurality of electric elements. For example, each lens may include a liquid crystal lens for electrochromic (light control) and a liquid crystal lens for presbyopia correction. Further, each lens may include a plurality of liquid crystal lenses for vision correction so as to be capable of corresponding to multiple foci. Note that, in these cases, four or more electrodes are disposed in an edge portion of each lens.

Note that, the number of electrodes that one electric element includes is not limited to two, and may naturally be one, or three or more, depending on the type of electrical element.

This application is entitled to and claims the benefit of Japanese Patent Application No. 2018-020430 filed on Feb. 7, 2018 and Japanese Patent Application No. 2018-185330 filed on Sep. 28, 2018, the disclosures of which including the specifications, drawings and abstracts are incorporated herein by reference in their entirety.

INDUSTRIAL APPLICABILITY

The present invention is suitably used as eyewear provided with a lens including an electric element.

REFERENCE SIGNS LIST

100 Electronic glasses
110 Lens
111 Liquid crystal lens
112a, 112b Electrode
113 Edge portion
113a Electrode exposure portion
113b Tip surface
113c Front-side surface
113d Rear-side surface 120 Frame
130 Front
131A, 131B, 131D, 131E Rim
131E1 First rim element
131E2 Second rim element
131a, 131a6 First covering portion
131b, 131b6 Second covering portion
131c, 131c6 Locking groove
131d Bottom surface
131e First side surface
131f Second side surface
131g6 First connection portion
131h6 Second connection portion
131i6 Accommodation portion
131j6 Through-hole
131k Groove portion
131m Locking portion
131n Rim lock
132 Bridge
132a Groove portion
132b Bottom surface portion
132c Upper surface portion
132d Lower surface portion
132e Upper-side locking portion
132f Lower-side locking portion
132g Rear-side opening portion
133 Nose pad
140 Temple
140a Temple-side hinge portion
140b Plate portion
140c Plate portion
140d Pin support hole
140e Pin support hole
141 Housing
142 Detection section
150 Control section
160 Power source
200 Flexible substrate
201 Conductive layer
2011 First conductive wire
2012 Second conductive wire
2013 First contact portion
2014 Second contact portion
202 Insulation cover
210 Connection portion
300 Conductive piece
301 First connection surface
302 Second connection surface
400A, 400B, 400C, 400D Insulation member
401, 401D Bottom plate portion
402, 402C, 402D First side plate portion
403, 403C, 403D second side plate portion
404 First insulation film
405 Second insulation film
406D Accommodation portion
500 Covering member
6 End piece portion
61 First element
62 Second element
63 First groove portion
64 First hinge portion
64a, 64b Pin support hole
65 Protrusion
66 Second groove portion
7 Cover member
7a Cover element
7b Locking portion
7c First plate portion
7d Second plate portion
7e Gap
8 Hinge member
81 First element
81a First cover plate portion
81b Locking portion
81c First plate portion
81d Second plate portion
81e Claw portion
81f Claw portion
81g Gap
82 Second element
82a Second cover plate portion
82b First plate portion
82c Second plate portion
82d Second hinge portion
82e Gap
82f Claw portion
82g Claw portion
82h Plate portion
82i Plate portion
82j Pin support hole
82k Pin support hole
82m Cover portion
82n Cutout
83 Connection portion
83a, 83b Recessed portion
84 Hinge portion
9, 9A, 9B Coupling pin

What is claimed is:

1. Eyewear, comprising:
a front including a rim portion that holds a lens and is made of metal;
a flexible substrate arranged along an inner surface of the rim portion, and including a conductive layer and an insulation cover that covers the conductive layer; and
a first insulator formed separately from the insulation cover and arranged so as to surround the flexible substrate between the inner surface of the rim portion and the flexible substrate.

2. The eyewear according to claim 1, further comprising:
a conductive section including the flexible substrate and a conductive piece which connects between an electrode of an electric element disposed in the lens and the conductive layer;
wherein the flexible substrate is disposed so as to surround the conductive section;
a lens held in the front and including an edge portion in which a part of the electrode of the electric element is disposed; and
a control section that controls the electric element.

3. The eyewear according to claim 2, wherein:
the front includes an end piece portion that is made of metal;
the eyewear further comprises a hinge member that is made of non-metal and constitutes a hinge portion together with the end piece portion;
the flexible substrate is connected to the control section and is disposed so as to be along the edge portion, and
the flexible substrate is partially disposed in a gap between the end piece portion and the hinge member.

4. The eyewear according to claim 3, wherein:
the end piece portion includes an end piece-side first element extending in a width direction, and an end piece-side second element extending backward from one end portion of the end piece-side first element, and the hinge member includes a hinge-side first element engaging with the end piece-side first element, and a hinge-side second element engaging with the end piece-side second element.

5. The eyewear according to claim 4, wherein:
the hinge-side first element includes a first housing portion in which the flexible substrate is disposed, and
the hinge-side second element includes a second housing portion in which the flexible substrate is disposed.

6. The eyewear according to claim 4, comprising a recessed portion in a connection portion of the hinge-side first element and the hinge-side second element.

7. The eyewear according to claim 4, wherein
the connection portion of the hinge-side first element and the hinge-side second element is configured to be elastically deformable.

8. The eyewear according to claim 3, further comprising a temple made of non-metal and coupled to the front at one end of the temple via the hinge portion, wherein
the control section is held in the temple.

9. The eyewear according to claim 2, wherein
the control section is held in a temple.

10. The eyewear according to claim 2, further comprising a cover member held by a bridge of the front, wherein
the flexible substrate is partially disposed in a gap between the bridge and the cover member.

11. The eyewear according to claim 2, wherein
the flexible substrate is disposed along the edge portion, is connected to the control section and includes a conductor surface facing the edge portion; and
the conductive piece comes into contact with the electrode and the conductor surface.

12. The eyewear according to claim 11, wherein:
the lens includes a curved surface that is convex from one side toward another side along an optical axis of the lens, and
the front includes a first covering portion covering another side of the conductive piece.

13. The eyewear according to claim 12, wherein
the first insulator includes a first element disposed between the first covering portion and the conductive piece.

14. The eyewear according to claim 13, wherein
the front includes a second covering portion covering one side of the conductive piece.

15. The eyewear according to claim 14, wherein:
the edge portion includes a protruding portion inserted between the first covering portion and the second covering portion,
the electrode is exposed from a tip of the protruding portion, and
the conductive piece is pressed by the protruding portion and the conductor surface.

16. The eyewear according to claim 14, wherein
the first insulator includes a second element disposed between the second covering portion and the conductive piece.

17. The eyewear according to claim 16, wherein:
the first insulator includes a continuous element connecting between the first element and the second element, and
the conductive section is disposed at a position at least partially surrounded by the first element, the second element, and the continuous element.

18. The eyewear according to claim 16, wherein
the first element and the second element are each film-like and fixed to the first covering portion and the second covering portion, respectively.

19. The eyewear according to claim 16, wherein
a second insulator is disposed between the first covering portion and the conductive piece and between the second covering portion and the conductive piece.

20. The eyewear according to claim 16, wherein
the first element and the second element include end edges on sides close to the optical axis, the end edges being closer to the optical axis than the conductive piece is.

21. The eyewear according to claim 20, wherein
the end edges are farther from the optical axis than end edges on sides close to the optical axis of the first covering portion and the second covering portion is.

22. The eyewear according to claim 1, further comprising:
a conductive section including the flexible substrate and a conductive piece which connects between an electrode of an electric element disposed in the lens and the conductive layer;
wherein the flexible substrate is disposed so as to surround the conductive section.

* * * * *